(12) United States Patent
Gupta et al.

(10) Patent No.: US 12,381,872 B2
(45) Date of Patent: Aug. 5, 2025

(54) METHOD AND SYSTEM FOR AUTHENTICATING WIRELESS DEVICES

(71) Applicant: SAMSUNG ELECTRONICS CO., LTD., Suwon-si (KR)

(72) Inventors: Vipul Gupta, Noida (IN); Ankur Agrawal, Noida (IN); Vaibhav Negi, Noida (IN); Rahul Agrawal, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 426 days.

(21) Appl. No.: 17/854,846

(22) Filed: Jun. 30, 2022

(65) Prior Publication Data
US 2023/0188520 A1    Jun. 15, 2023

Related U.S. Application Data

(63) Continuation of application No. PCT/KR2022/004931, filed on Apr. 6, 2022.

(30) Foreign Application Priority Data

Dec. 15, 2021 (IN) .............................. 202141058494

(51) Int. Cl.
*H04L 9/40* (2022.01)
*H04W 12/06* (2021.01)

(52) U.S. Cl.
CPC ......... *H04L 63/0861* (2013.01); *H04W 12/06* (2013.01)

(58) Field of Classification Search
CPC . H04L 63/0861; H04L 9/0866; H04L 9/0891; H04L 9/3231; H04L 2209/80; H04W 12/06; H04W 12/065; H04W 4/80
(Continued)

(56) References Cited

U.S. PATENT DOCUMENTS 9,100,826 B2 *   8/2015  Weiss ................. G06Q 20/3676
9,208,492 B2 *  12/2015  Hoyos ................. H04L 63/0853
(Continued)

FOREIGN PATENT DOCUMENTS

CA    3119829 A1    11/2014
CN    104303481 A    1/2015
(Continued)

OTHER PUBLICATIONS

European Extended Search Report issued May 8, 2024 by the European Patent Office for EP Patent Application No. 22907583.3.
(Continued)

*Primary Examiner* — Samson B Lemma
(74) *Attorney, Agent, or Firm* — Sughrue Mion, PLLC

(57) ABSTRACT

Embodiments herein provide a method for authenticating wireless devices. The method includes generating, by a first wireless device, first biometric data of a user based on a user input. The method further includes determining, by the first wireless device, at least one standard parameter of a first wireless signal being generated by the first wireless device. The method further includes modifying, based on the first biometric data, the at least one standard parameter of the first wireless signal resulting in a second wireless signal. The method further includes transmitting, by the first wireless device to a second wireless device, the second wireless signal, based on a match between the at least one standard parameter of the second wireless signal and at least one reference parameter of a third wireless signal that has been pre-stored in the second wireless device.

20 Claims, 21 Drawing Sheets

(58) Field of Classification Search
USPC .......................................................... 726/6
See application file for complete search history.

(56) References Cited

U.S. PATENT DOCUMENTS

| | | | | |
|---|---|---|---|---|
| 9,294,475 | B2* | 3/2016 | Hoyos | ................. H04L 63/0861 |
| 9,313,200 | B2* | 4/2016 | Hoyos | ................. H04L 63/0853 |
| 10,397,080 | B2* | 8/2019 | Brik | ...................... H04L 47/20 |
| 2007/0050303 | A1* | 3/2007 | Schroeder | ............ G07F 7/1016 |
| | | | | 705/67 |
| 2007/0234066 | A1* | 10/2007 | Dufour | ................... G06F 21/32 |
| | | | | 713/186 |
| 2010/0082491 | A1* | 4/2010 | Rosenblatt | ............ G06Q 20/10 |
| | | | | 705/13 |
| 2010/0167753 | A1* | 7/2010 | Das | ......................... H04W 4/02 |
| | | | | 455/556.1 |
| 2013/0076482 | A1* | 3/2013 | Wan | ....................... G07C 9/257 |
| | | | | 340/5.3 |
| 2013/0183936 | A1 | 7/2013 | Smith et al. | |
| 2016/0149904 | A1 | 5/2016 | Kim et al. | |
| 2016/0182507 | A1 | 6/2016 | Zhang et al. | |
| 2019/0073845 | A1* | 3/2019 | Ives-Halperin | ......... G06Q 10/02 |
| 2021/0058393 | A1* | 2/2021 | Alpert | ................. H04L 63/0876 |
| 2021/0166508 | A1 | 6/2021 | Ziller | |

FOREIGN PATENT DOCUMENTS

| | | | | |
|---|---|---|---|---|
| CN | 106575328 | A | 4/2017 | |
| CN | 112637834 | B | 6/2021 | |
| EP | 2919430 | A1 * | 9/2015 | ......... A61B 5/02438 |
| KR | 10-2228653 | B1 | 3/2021 | |
| KR | 10-2021-0141299 | A | 11/2021 | |
| WO | 2017/075063 | A1 | 5/2017 | |
| WO | WO-2017091431 | A1 * | 10/2018 | ............. G06F 21/32 |

OTHER PUBLICATIONS

Ivan, "Samsung Galaxy SmartTag review", Gsmarena, Mar. 7, 2021, (11 pages total).
IEEE Computer Society, "IEEE Standard for Low-Rate Wireless Networks Amendment 1: Enhanced Ultra Wideband (UWB) Physical Layers (PHYs) and Associated Ranging Techniques", LAN/MAN Standards Committee, IEEE Std 802.15.4z™-2020, Jun. 2020, (174 pages total).
International Search Report (PCT/ISA/210) issued Sep. 1, 2022 by the International Searching Authority in International Application No. PCT/KR2022/004931.
Written Opinion (PCT/ISA/237) issued Sep. 1, 2022 by the InternationalInternational Application No. PCT/KR2022/004931.
Communication dated Nov. 3, 2023 by the Indian Patent Office in corresponding Indian Application No. 202141058494.

* cited by examiner

METHOD AND SYSTEM FOR AUTHENTICATING WIRELESS DEVICES

CROSS-REFERENCE TO RELATED APPLICATIONS

This application is a continuation application of International application No. PCT/KR2022/004931, filed on Apr. 6, 2022, which claims priority to Indian Patent Application No. 202141058494, filed on Dec. 15, 2021, in the Indian Patent Office, the disclosures of which are incorporated by reference herein in their entireties.

BACKGROUND

1. Field

The present disclosure relates to authenticating techniques, and more specifically to a method and a system for authenticating wireless devices.

2. Description of Related Art

A smart tag is a wireless tracking device that attaches to objects such as keys, luggage, purses, etc. using a small strap or by other means, such as a keychain. After pairing with the smart tag, an auxiliary device such as a smartphone may be used for searching and locating the smart tag. Similarly, the auxiliary device may pair with an internet of things (IoT) device for controlling the IoT device. Generally, an account of a user of the auxiliary device needs to be registered with the smart tag and the IoT device as part of the pairing. A server may connect to the auxiliary device (e.g., via internet) to verify the account while registering the account. The server may be involved in additional tasks, such as controlling the IoT device, sharing a location of the smart tag, and the like, that a registered user performs with the smart tag. As such, the server may contain data including account details of the registered user and location information of the smart tag. That is, the privacy of the registered user is shared with the server. In certain scenarios, an unauthorized user, such as an intruder having access to the server who is not registered to the auxiliary device of the registered user, may obtain the account details of the registered user and the location information of the smart tag from the server. Even if the smart tag is located far away, the intruder may locate the smart tag using other auxiliary devices connected to the same server, which may present a serious security threat to the registered user.

In order to secure the smart tag from the intruder, a conventional method may propose an encrypted data communication between the smart tag and the auxiliary device. However, the conventional method may lack run-time checking of a physical presence of the registered user of the auxiliary device. As such, anyone (e.g., an unauthorized user) may use the auxiliary device of the registered user for operating the smart tag without knowledge by the registered user once the auxiliary device has been paired with the smart tag, which may present another major security threat.

Registration of the account may be needed on the other auxiliary devices if the registered user wants to track the smart tag using the other auxiliary devices. Such repetition of the registration may reduce an interest of the user in using the smart tag. Alternatively or additionally, internet connectivity between the server and the auxiliary device and/or the smart tag may be disrupted, which may cause the auxiliary device to not perform the tasks at the smart tag until the internet connectivity is resumed, even if the smart tag is wirelessly connected to the auxiliary device. As a result, the registered user may fail to locate and/or operate the smart tag.

FIG. 1A illustrates an example scenario of locating a smart tag (20A) by an intruder (12), according to related art. Consider, an auxiliary device (10A) that is paired with the smart tag (20A), and a registered user (11) uses the auxiliary device (10A) to request for a location of the smart tag (20A) at step 11A. At step 11B, the smart tag (20A) provides the location information of the smart tag (20A) to the auxiliary device (10A). Further, the user (11) may locate the smart tag (20A) based on the location information. Consider, an auxiliary device (10B) that is not paired with the smart tag (20A), and the intruder (12) uses the auxiliary device (10B) to request the location of the smart tag (20A) at step 12A. Since the auxiliary device (10B) is not paired with the smart tag (20A), the smart tag (20A) rejects the request of the auxiliary device (10B) and sends a rejection response to the auxiliary device (10B) at step 12B. While receiving the response, the intruder (12) uses the auxiliary device (10B) to calculate a time of flight and an angle of deviation of a wireless signal received from the smart tag (20A), and find out the location of the smart tag (20A) based on the time of flight and the angle of deviation of the wireless signal. Further, the intruder (12) may locate and steal the smart tag (20A). Thus, the registered user (11) loses the smart tag (20A), which may present a security threat to the registered user (11).

FIG. 1B illustrates an example scenario of controlling a smart air conditioner (AC) (20B) by an unauthorized user (13), according to related art. Consider, the auxiliary device (10A) is paired with the smart AC (20B), and the registered user (11) uses the auxiliary device (10A) to send a request for increasing ambient temperature to the smart AC (20B) at step 14A. At step 14B, the smart AC (20B) increases the ambient temperature and provides a success response to the auxiliary device (10A) of the registered user (11). Thus, the registered user (11) may control the smart AC (20B). Consider, a friend (13) of the registered user (11) wants to reduce the ambient temperature of the smart AC (20B), where the friend (13) does not have a registered account with the auxiliary device (10A). At 13A-13B, while the registered user (11) is away from the auxiliary device (10A), the friend (13) may take the opportunity to misuse/mishandle the account of the registered user (11) in the auxiliary device (10A) in the absence of the registered user (11) to decrease the ambient temperature of the smart AC (20B) without informing the registered user (11) or getting approval from the registered user (11), which degrades an authority of the registered user (11) on the smart AC (20B). Thus, it is desired to at least provide a useful alternative for enhancing security of the electronic devices and the privacy of the registered user.

SUMMARY

Some embodiments presented herein provide a method and a system for authenticating wireless devices. A first wireless device of the system generates an encrypted wireless signal by varying standard parameters of the wireless signal, such as pulse duration, distribution factors, frequency, etc., based on biometric data of the user. The second wireless device authenticates the first wireless device by decrypting the encrypted wireless signal received from the first wireless device. Alternatively or additionally, the second wireless device indirectly verifies whether a registered user of the first wireless device is handling the first wireless device based on the authentication of the first wireless device. In response to authenticating the first wireless device, the second wireless device allows the first wireless device to locate, as well as, control the second wireless device. Thus, the method presented herein may enhance a security of the second wireless device and may ensure that the registered user is handling both wireless devices.

Other embodiments presented herein may enhance a personalized security of the wireless signal without significantly impacting power consumption or necessitating an increase of signal strength. That is, a network resource consumption of a system presented herein for transmitting the encrypted wireless signal may be comparable to network resource consumption of normal (e.g., unencrypted) data communication between conventional wireless devices. The system presented herein modifies the standard parameters of the wireless signal based on the biometric data for encrypting the wireless signal rather than using cryptographic keys. Hence, the system presented herein enhances the personalized security of the wireless signal without significantly impacting power consumption or necessitating an increase of signal strength.

In accordance with an aspect of the disclosure, a method for authenticating wireless devices by a first wireless device is provided. The method includes generating first biometric data of a user based on a first user input. The method further includes determining at least one standard parameter of a first wireless signal being generated by the first wireless device. The method further includes modifying, based on the first biometric data, the at least one standard parameter of the first wireless signal resulting in a second wireless signal. The method further includes transmitting, to a second wireless device, the second wireless signal, causing the first wireless device to be authenticated by the second wireless device, based on a match between the at least one standard parameter of the second wireless signal and at least one reference parameter of a third wireless signal that has been pre-stored in the second wireless device.

In accordance with an aspect of the disclosure, a method for authenticating wireless devices by a second wireless device is provided. The method includes receiving, from a first wireless device, a first wireless signal, wherein at least one standard parameter of the first wireless signal has been modified based on first biometric data of a user. The method further includes determining whether the at least one modified standard parameter of the first wireless signal matches at least one reference parameter of a second wireless signal pre-stored in the second wireless device. The method further includes authenticating the first wireless device, based on the determining that the at least one modified standard parameter of the first wireless signal matches at least one reference parameter of a second wireless signal pre-stored in the second wireless device.

In accordance with another aspect of the disclosure, a first wireless device is provided. The first wireless device comprises a memory in which a computer program is stored and at least one processor configured to execute the computer program to implement the method provided in the first aspect embodiment or any embodiment of the first aspect.

In accordance with another aspect of the disclosure, a second wireless device is provided. The second wireless device comprises a memory in which a computer program is stored and at least one processor configured to execute the computer program to implement the method provided in the second aspect embodiment or any embodiment of the second aspect.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
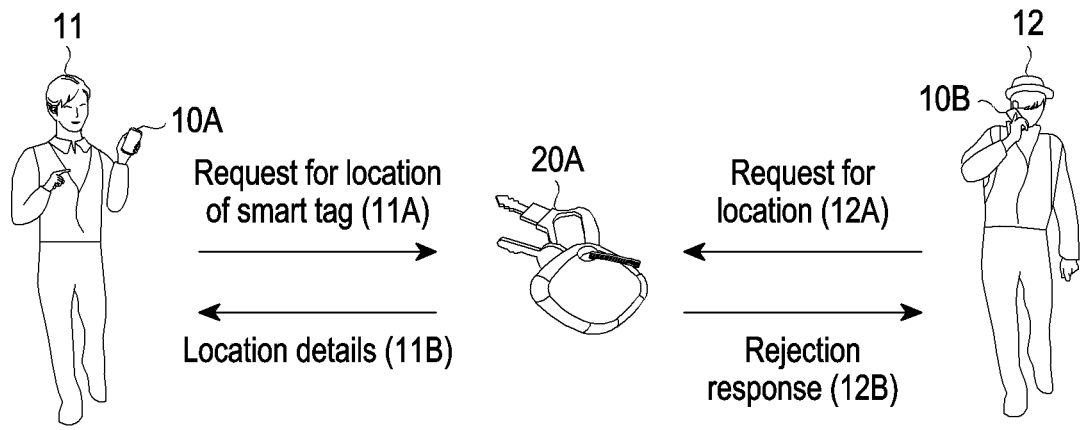
FIG. 1A illustrates an example scenario of locating a smart tag by an intruder, according to related art.
Figure 1B:
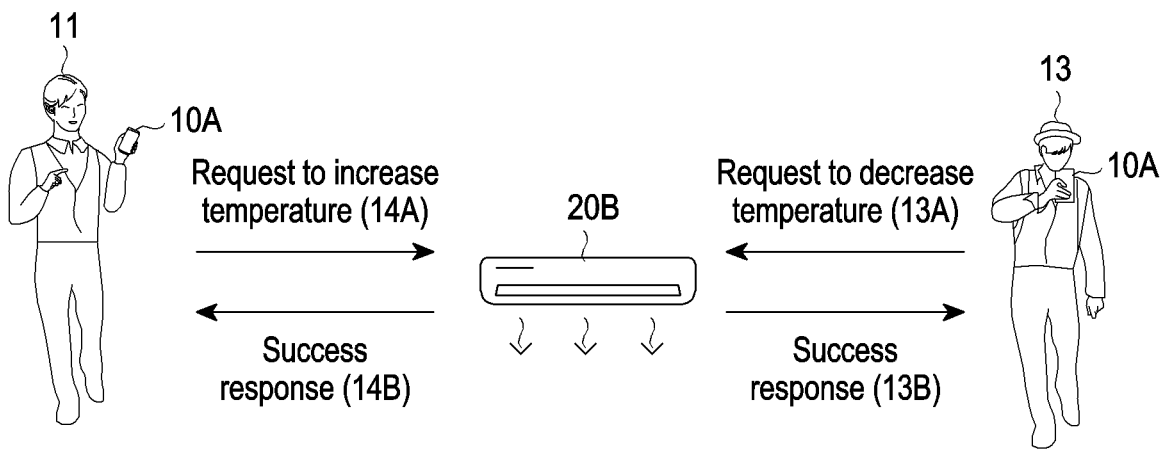
FIG. 1B illustrates an example scenario of controlling a smart air conditioner by an unauthorized user, according to related art.

The embodiments presented herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The embodiments presented herein provide a method for authenticating wireless devices. The method includes generating, by a first wireless device, biometric data of a user based on a user input. The method includes determining, by the first wireless device, a standard parameter of a wireless signal being generated by the first wireless device. The method includes transmitting, by the first wireless device, the wireless signal to a second wireless device by modifying the standard parameter of the wireless signal based on the biometric data. The method includes receiving, by the second wireless device, the wireless signal from the first wireless device. The method includes authenticating, by the second wireless device, the first wireless device based on a match between the modified standard parameter of the wireless signal and a reference parameter of the wireless signal pre-stored in the second wireless device.

Alternatively or additionally, the embodiments presented herein provide a system for authenticating the wireless devices. The system includes the first wireless device and the second wireless device. The first wireless device is configured for generating the biometric data of the user based on the user input. The first wireless device is configured for determining the standard parameter of the wireless signal being generated by the first wireless device. The first wireless device is configured for transmitting the wireless signal to the second wireless device in the system by modifying the standard parameter of the wireless signal based on the biometric data. The wireless device is configured for receiving the wireless signal from the first wireless device. The wireless device is configured for authenticating the first wireless device based on the match between the modified standard parameter of the wireless signal and the reference parameter of the wireless signal pre-stored in the second wireless device.

Unlike conventional methods and systems, aspects presents herein provide for a system that generates an encrypted wireless signal by varying standard parameters of the wireless signal, such as pulse duration, distribution factors, frequency, etc., based on biometric data of the user. The second wireless device authenticates the first wireless device by decrypting the encrypted wireless signal received from the first wireless device. The second wireless device indirectly verifies whether a registered user of the first wireless device is handling the first wireless device based on the authentication of the first wireless device. In response to authenticating the first wireless device, the second wireless device allows the first wireless device to locate as well as control the second wireless device. Thus, the aspects presented herein provide for a method that may improve the security of the second wireless device and may ensure that the registered user is handling both devices.

Conventional methods and systems may use cryptographic keys to encrypt the wireless signal to secure the second wireless device from what may be referred to as a "man-in-the-middle" attack, for example. However, conventional methods may only be able to encrypt a few parameters for hiding the second wireless device from an intruder. As such, the intruder may follow other methods to track the second wireless device even when the wireless signal is encrypted using the cryptographic keys. In addition, network resource consumption may be higher to carry the encrypted wireless signal when compared to normal (e.g., unencrypted) data communication between both devices. Unlike conventional encryption methods and systems, the network resource consumption of the system presented herein for transmitting the encrypted wireless signal may be comparable to network resource consumption of conventional (e.g., unencrypted) data communications between both devices. Aspects presented herein provide for a system that modifies the standard parameters of the wireless signal based on the biometric data for encrypting the wireless signal rather than using the cryptographic keys. Hence, the system presented herein enhances the personalized security of the wireless signal without significantly impacting power consumption or necessitating an increase of signal strength.

Referring now to the drawings, and more particularly to FIGS. 2A through 15, there are shown preferred embodiments.

Figure 2A:
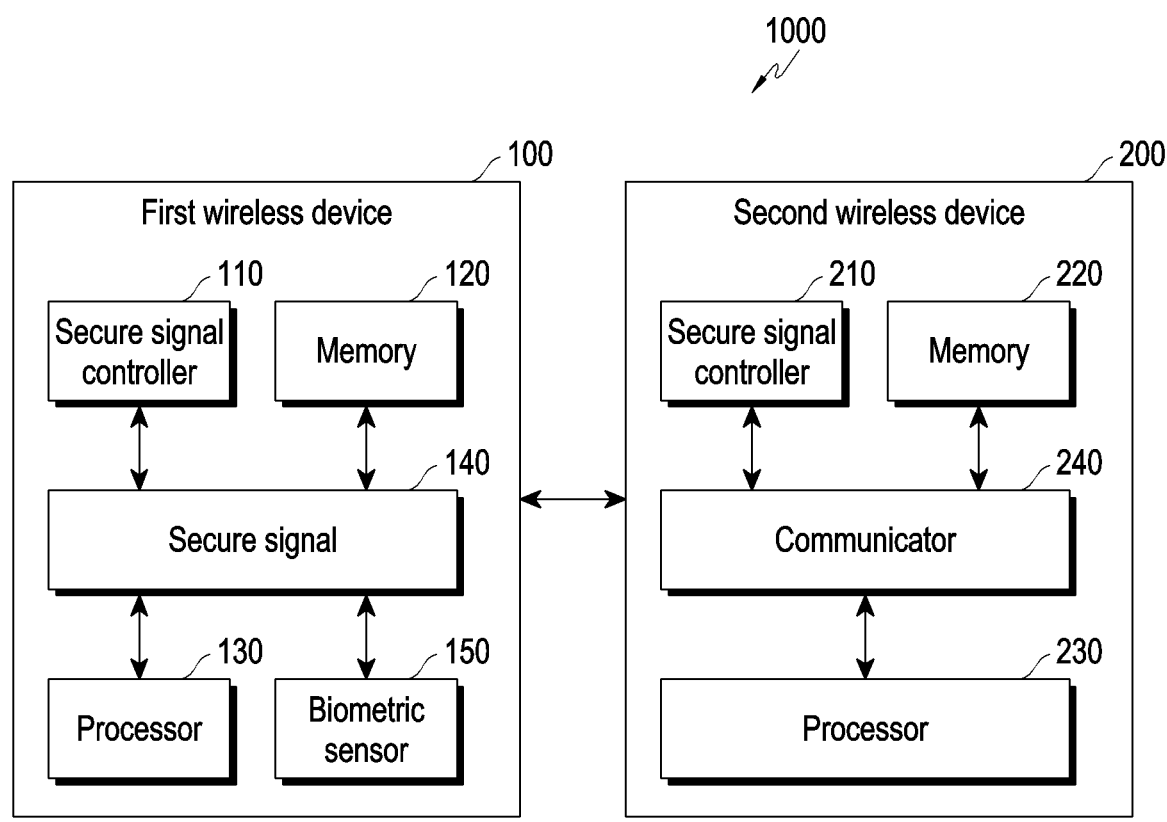
FIG. 2A is a block diagram of a system for authenticating wireless devices, according to an embodiment as disclosed herein.

FIG. 2A is a block diagram of a system (1000) for authenticating wireless devices, according to an embodiment as disclosed herein. In an embodiment, the system (1000) includes a first wireless device (100) and a second wireless device (200). Examples of the first wireless device (100) and the second wireless device (200) include, but are not limited to a smart phone, a tablet computer, a personal digital assistance (PDA), a desktop computer, an IoT device, a smart tag, etc. The first wireless device (100) includes a secure signal controller (110), a memory (120), a processor (130), a communicator (140), and a biometric sensor (150). Examples of the biometric sensor (150) include, but are not limited to, a fingerprint scanner, an iris scanner, a face scanner, etc. The biometric sensor (150) generates biometric data of a user upon receiving initial user input or a user input, such as fingerprint scan, iris scan, face scan, etc., examples for the biometric data includes, but are not limited to fingerprint data, an iris data, a face identity, etc. In some embodiments, the biometric sensor (150) may include a grid of capacitance cells with a default capacitance value of 100 units, where the capacitance cells are arranged in form of a two dimensional (2D) array in the grid. The capacitance value (i.e., farad value) of each cell is also called a biometric cell value, which changes up to 0 units from the default capacitance value based on an impression of a biometric (e.g., body part such as a tip of a finger) fallen on the biometric sensor (150). The capacitance value of each cell may change based on physical properties of the biometric, such as impressions of the biometric. In the case of fingerprint data, the impressions may include ridges and valleys of the finger of the user. The biometric sensor (150) may provide the capacitance value of the grid as the biometric data after receiving the impression of the biometric of the user. The second wireless device (200) includes a secure signal controller (210), a memory (220), a processor (230), and a communicator (240).

The memory (120) stores the biometric data of the user that is generated by the biometric sensor (150) in response to scanning the biometric, such as a fingerprint or an iris, etc. of the user. The memory (220) stores the reference parameter of a wireless signal received by the second wireless device (200) from the first wireless device (100). The wireless signal may be a radio frequency signal such as an ultra-wide band (UWB) signal, a Bluetooth signal, a wireless fidelity (Wi-Fi) signal, etc. The memory (120) and the memory (220) store instructions to be executed by the processor (130) and the processor (230), respectively. The memory (120, 220) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120, 220) may, in some examples, be considered a non-transitory storage medium. The term "non-transitory" may indicate that the storage medium is not embodied in a carrier wave or a propagated signal. However, the term "non-transitory" should not be interpreted that the memory (120, 220) is non-movable. In some examples, the memory (120, 220) may be configured to store larger amounts of information than its storage space. In certain examples, a non-transitory storage medium may store data that may, over time, change (e.g., in random access memory (RAM) or cache). The memory (120) may be an internal storage unit or may be an external storage unit of the first wireless device (100), a cloud storage, or any other type of external storage. The memory (220) may be an internal storage unit or may be an external storage unit of the second wireless device (200), a cloud storage, or any other type of external storage.

The processor (130) and the processor (230) are configured to execute instructions stored in the memory (120) and the memory (220), respectively. The processor (130, 230) may be a general-purpose processor, such as a central processing unit (CPU), an application processor (AP), or the like, a graphics-only processing unit such as a graphics processing unit (GPU), a visual processing unit (VPU) and the like. The processor (130, 230) may include multiple cores to execute the instructions.

The communicator (140) and the communicator (240) are configured for communicating internally between hardware components in the first wireless device (100) and the second wireless device (200), respectively. The communicator (140) is configured to facilitate the communication between the first wireless device (100) and other devices (e.g., second wireless device (200), server (300) of FIG. 15) via one or more networks (e.g., radio technology). The communicator (240) is configured to facilitate the communication between the second wireless device (200) and other devices (e.g., first wireless device (100), server (300)) via one or more networks (e.g., radio technology). The communicator (140, 240) includes an electronic circuit specific to a standard (e.g., Ethernet, Bluetooth, Wi-Fi) that enables wired or wireless communication.

The secure signal controller (110) and the secure signal controller (210) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the first wireless device (100) is paired to the second wireless device (200). In order to register the user with the first wireless device (100) and/or the second wireless device (100), the secure signal controller (110) obtains the biometric of the user from the initial user input (e.g., fingerprint scan, iris scan, face scan) and generates the biometric data of the user using the biometric sensor (150). For example, the initial user input may refer to a biometric of the user obtained during a registration of the user with the first wireless device (100). That is, the secure signal controller (110) may store the biometric data of the user, from the initial user input, to the memory (120) to register the user with the first wireless device (100). Further, the secure signal controller (110) determines a standard parameter of a wireless signal being generated by the first wireless device (100).

In an embodiment, the standard parameter of the wireless signal includes a number of distribution of short duration pulses of the wireless signal, a duration of an interval between the short duration pulses, a frequency of each distributed short duration pulse, an amplitude of the wireless signal, a phase of the wireless signal, and a shape of the wireless signal. The secure signal controller (110) modifies the standard parameter of the wireless signal based on the biometric data. The secure signal controller (110) generates the wireless signal based on the modified standard parameter. The secure signal controller (110) transmits the wireless signal with the modified standard parameter to the second wireless device (200). The secure signal controller (210) receives the wireless signal and determines the modified standard parameter from the wireless signal. The secure signal controller (210) pre-stores the standard parameter as the reference parameter of the wireless signal to the memory (220) for registering the user.

In another embodiment, the secure signal controller (110) monitors an availability of the second wireless device (200) using the wireless signal. In response to detecting the availability of the second wireless device (200), the secure signal controller (110) obtains the biometric of the user from the initial user input and generates the biometric data of the user using the biometric sensor (150). The secure signal controller (110) may store the biometric data of the user to the memory (120) to register the user with the first wireless device (100). Further, the secure signal controller (110) determines the standard parameter of the wireless signal being generated by the first wireless device (100). The secure signal controller (110) modifies the standard parameter of the wireless signal based on the biometric data. The secure signal controller (110) generates the wireless signal based on the modified standard parameter. The secure signal controller (110) transmits the wireless signal with the modified standard parameter to the second wireless device (200). The secure signal controller (210) receives the wireless signal and determines the modified standard parameter from the wireless signal. The secure signal controller (210) pre-stores the standard parameter as the reference parameter of the wireless signal to the memory (220) for registering the user, and pairs the first wireless device (100) with the second wireless device (100).

In order to access, locate, and/or control the second wireless device (200) by the user, the user later provides the user input to the first wireless device (100). The secure signal controller (110) generates the biometric data of the user based on the user input using the biometric sensor (150). Further, the secure signal controller (110) determines the standard parameter of the wireless signal being generated by the first wireless device (100). Further, the secure signal controller (110) modifies the standard parameter of the wireless signal based on the biometric data. The secure signal controller (110) generates the wireless signal based on the modified standard parameter. Further, the secure signal controller (110) transmits the wireless signal to the second wireless device (200).

The secure signal controller (210) receives the wireless signal from the first wireless device (100). Further, the secure signal controller (210) authenticates the first wireless device (100) based on a match between the modified standard parameter of the wireless signal and the reference parameter of the wireless signal pre-stored in the second wireless device (200). In an embodiment, the secure signal controller (210) determines the modified standard parameter of the wireless signal. Further, the secure signal controller (210) fetches the reference parameter of the wireless signal from the memory (220). Further, the secure signal controller (210) determines whether the modified standard parameter of the wireless signal matches to the reference parameter of the wireless signal pre-registered in the second wireless device (200). The secure signal controller (210) enables the first wireless device (100) to access, locate, and/or control the second wireless device (200), in response to determining that the modified standard parameter of the wireless signal matches to the reference parameter of the wireless signal. The secure signal controller (210) denies the first wireless device (100) to access, locate, and/or control the second wireless device (200), in response to determining that the modified standard parameter of the wireless signal does not match to the reference parameter of the wireless signal.

In an embodiment, in order to modify the standard parameter, the secure signal controller (110) determines the biometric cell value of the biometric data. The biometric cell value indicates a specific property of the biometric data, and includes a number of columns containing the biometric data in the biometric grid, a number of cells containing the biometric data in each column, and the capacitance value of cells containing the biometric data in each column. The secure signal controller (110) selects the standard parameter of the wireless signal based on a number of the biometric cell value. Further, the secure signal controller (110) modifies the selected standard parameter of the wireless signal based on the biometric cell value.

The system (1000) adds biometric security to the wireless signal (e.g., radio signal) by embedding the biometric encoding of the user into the physical properties of the transmitting signals. Thus, the data along with its embedded security travels in the wireless signal as a mode of transmission requiring no extra space. The biometric of the user is used such that the physical presence of the user may be ensured, and, hence, the data may not be accessed without knowledge and/or presence of the user. A "man-in-the-middle" attack is a commonly known way of stealing data being transferred through wireless signals. However, since the proposed system is applied to formulate the physical parameters of the wireless signal using the biometric encoding of the user, a "man-in-the-middle" attack may be unable to cause loss of data, as decryption of the wireless signal may not be accomplished without having access to the biometrically encoded wireless signal pattern.

Although FIG. 2A shows a particular set of hardware components of the system (1000), it is to be understood that other embodiments are not limited thereon. For example, in other embodiments, the system (1000) may include less or more components. Further, the labels and/or names of the components are used only for illustrative purposes and do not limit the scope of the invention. For example, one or more components may be combined together to perform same or substantially similar functionality for authenticating the wireless devices.

Figure 2B:
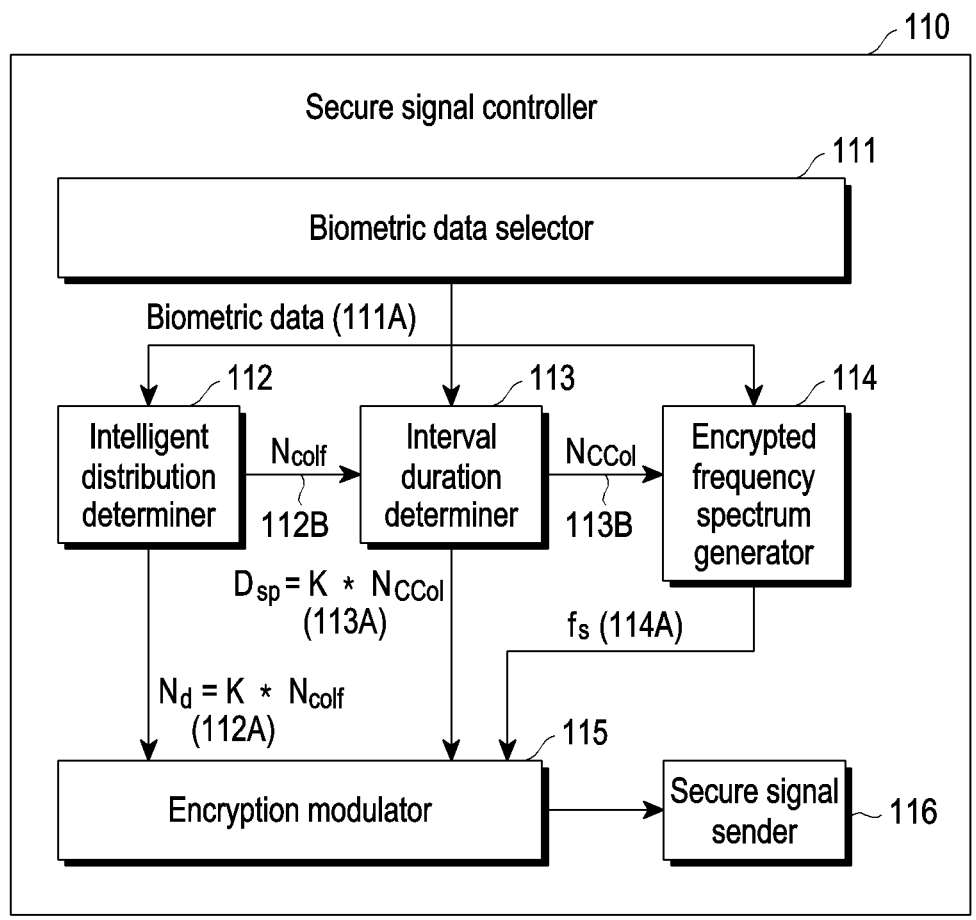
FIG. 2B is a block diagram of a secure signal controller of a first wireless device for transmitting a wireless signal to a second wireless device, according to an embodiment as disclosed herein.

FIG. 2B is a block diagram of the secure signal controller (110) of the first wireless device (100) for transmitting the wireless signal to the second wireless device (200), according to an embodiment as disclosed herein. In an embodiment, the secure signal controller (110) includes a biometric data selector (111), an intelligent distribution determiner (112), an interval duration determiner (113), an encrypted frequency spectrum generator (114), an encryption modulator (115), and a secure signal sender (116). The secure signal controller (110) generates a personalized wireless signal in which the biometric data of the user is encrypted in the form of various factors of the signals, such as pulse duration, distribution factors, frequency, etc.

The biometric data selector (111), the intelligent distribution determiner (112), the interval duration determiner (113), the encrypted frequency spectrum generator (114), the encryption modulator (115), and the secure signal sender (116) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The biometric data selector (111) obtains the biometric of the user from the initial user input or the user input, and generates the biometric data of the user using the biometric sensor (150). The biometric data selector (111) stores the biometric data of the user to the memory (120) to register the user with the first wireless device (100). In an embodiment, the biometric data selector (111) monitors the availability of the second wireless device (200) using the wireless signal. In response to detecting the availability of the second wireless device (200), the biometric data selector (111) obtains the biometric of the user from the initial user input and generates the biometric data of the user using the biometric sensor (150).

The biometric data selector (111) provides information of change in the farad/capacitance value in each cell as the biometric data to the intelligent distribution determiner (112), the interval duration determiner (113), and the encrypted frequency spectrum generator (114) for encrypting the biometrics of the user.

The intelligent distribution determiner (112) determines the number of distribution of short duration pulses ($N_d$) of the wireless signal using Equation 1.

$$N_d = K \times N_{colf} \quad \text{[Eq. 1]}$$

where K is a data proportionate constant, and $N_{colf}$ is a number of columns in the grid that contains the change in the default capacitance value or the number of columns that contains the impression of the biometric. For example, $N_{colf}$ indicates the number of columns that the finger/iris/face covers while scanning by the biometric sensor (150). There is no threshold for the $N_d$, where the $N_d$ is manipulated in proportion to the data that is being transferred.

The intelligent distribution determiner (112) provides the $N_{colf}$ to the interval duration determiner (113). The intelligent distribution determiner (112) receives the biometric data and determines the number of columns ($N_{colf}$) where the capacitance cell values have changed from their default values to determine the number of distributions in which the wireless signal should be divided in the encrypted form. The intelligent distribution determiner (112) shares the number of columns ($N_{colf}$) to the interval duration determiner (113). Based on amount of data that needs to be transferred using the encrypted wireless signal, a data proportionate constant (K) is defined to manipulate the number of distribution in proportion to the amount of data that needs to be transferred. This proportionate distribution value (K) is then shared with the encryption modulator (115). The intelligent distribution determiner (112) splits the wireless signal into a number of distributions in proportion (K) to the number of columns ($N_{colf}$) being covered by the biometric impression in the grid.

The interval duration determiner (113) determines the duration of the interval between the short duration pulses ($D_{sp}$) using Equation 2.

$$D_{sp} = K \times N_{CCol} \quad \text{[Eq. 2]}$$

where K is a data proportionate constant, and $N_{CCol}$ is a number of cells covered in respective columns. $D_{sp}$ defines the number of cells in each column the impression of the biometric is covering while the biometric is being scanned $N_{colf}$ by the biometric sensor (150). There is no threshold for $D_{sp}$, where $D_{sp}$ is modified in proportion to the data that is being transferred.

The interval duration determiner (113) receives the biometric data and the number of columns. The interval duration determiner (113) analyses the number of columns ($N_{colf}$) that were covered in the biometric data and identifies a number of cells ($N_{CCol}$) disturbed from default values due to the impression of the biometric in each cell of those particular columns. The interval duration determiner (113) shares the number of cells ($N_{CCol}$) disturbed from default values to the encrypted frequency spectrum generator (114) for determining the interval ($D_{sp}$) of the wireless signal generation in proportion (K) to the data that needs to be transferred adding the additional factor of biometric encryption into the physical parameter of the signal being generated.

The encrypted frequency spectrum generator (114) determines the frequency of each distributed short duration pulse (fs) using Equation 3.

$$f_s = (A-1) + (B-(A-1)) \times \text{FaradHash}(\{\text{cell array values}\}) \quad \text{[Eq. 3]}$$

where A is a lowest value of acceptable frequency in the wireless signal range, B is a highest value of acceptable frequency in the wireless signal range, the FaradHash is a function to encrypt farad values (e.g., capacitive values) of a number of cell values into a unique identifier, and the cell array values are an array of the farad values for each cell. The encrypted frequency spectrum generator (114) receives the biometric data and the number of cells covered in respective columns. The encrypted frequency spectrum generator (114) uses the biometric data and the number of cells covered in the respective columns to generate unique FaradHash values in each cell of a column and to encrypt the FaradHash values to form a unique value of the frequency that the particular distribution of the wireless signal should be able to fully encrypt the biometric of the user into the physical parameters of the wireless signal. The FaradHash values, in turn, produce frequencies in range of the wireless signal. The fs is generated to include the unique value of cell combination of the capacitance value in each column, and, thus, fs defines the spectrum of the frequencies for each distribution the wireless signal is divided into.

The encryption modulator (115) modifies the standard parameters (e.g., $N_d$, $D_{sp}$, $f_s$) of the wireless signal based on the biometric data. The encryption modulator (115) generates the wireless signal based on the modified standard parameter. The secure signal sender (116) transmits the wireless signal with the modified standard parameter to the second wireless device (200).

The secure signal sender (116) performs distribution and application of personalized factors to the generated wireless signal. The secure signal sender (116) applies a port mechanism to the coupled devices between a transmit mode for transmitting the generated wireless signal from a node and a receive mode for receiving wireless signal and providing the received wireless signal to the node.

Although FIG. 2B shows a particular set of hardware components of the secure signal controller (110), it is to be understood that other embodiments are not limited thereon. For example, in other embodiments, the secure signal controller (110) may include less or more components. Further, the labels and/or names of the components are used only for illustrative purposes and do not limit the scope of the invention. For example, one or more components may be combined together to perform same or substantially similar functionality for transmitting the wireless signal to the second wireless device (200).

Figure 3A:
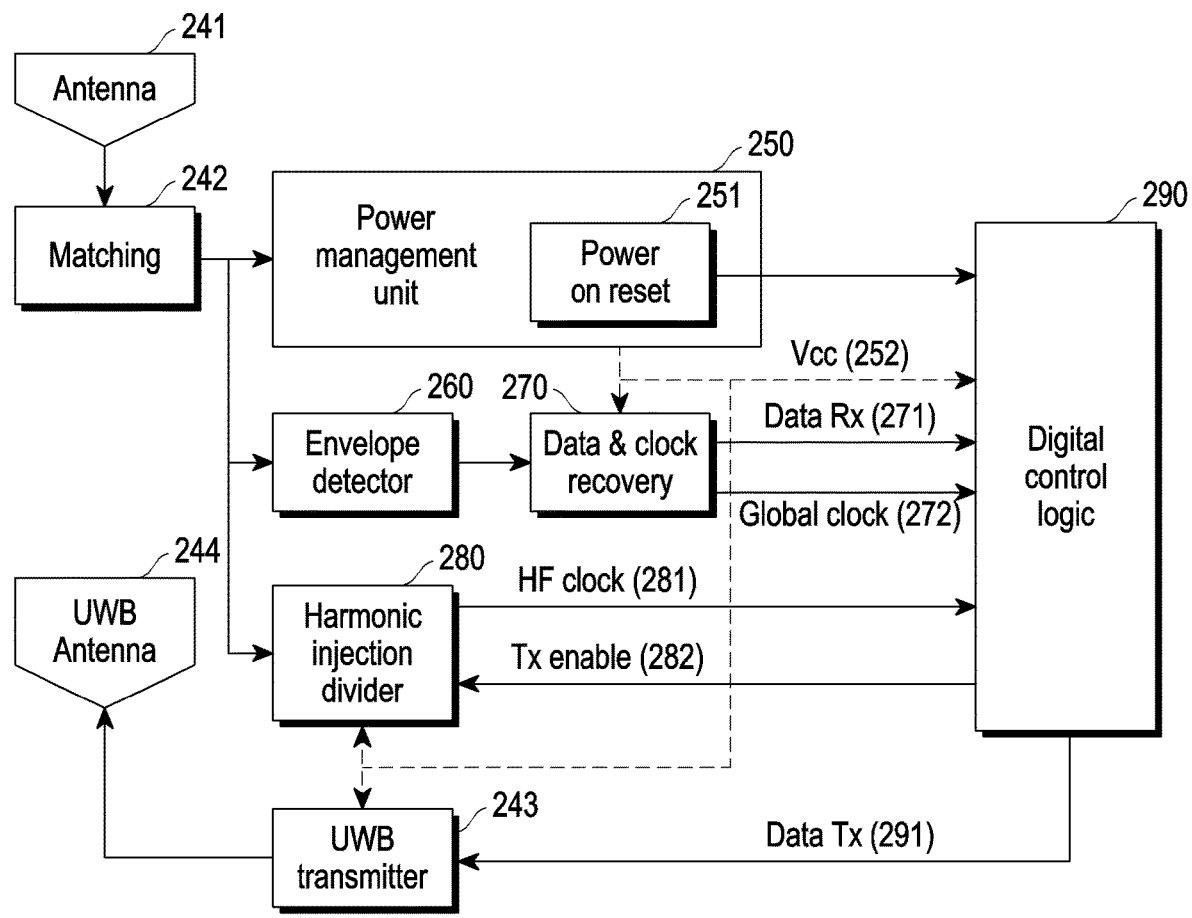
FIG. 3A is a block diagram of the second wireless device for authenticating the first wireless device, according to an exemplary embodiment as disclosed herein.

FIG. 3A is a block diagram of the second wireless device (200) for authenticating the first wireless device (100), according to an exemplary embodiment as disclosed herein. In the exemplary embodiment, the second wireless device (200) is the smart tag. A block diagram of the smart tag is shown in the FIG. 3A. The smart tag includes an antenna (241), a matching unit (242), a power management unit (250), an envelope detector (260), a data & clock recovery unit (270), a harmonics injection divider (280), a digital control logic unit (290), an UWB transmitter (243), and an UWB antenna (244), where the power management unit (250) includes a power on reset switch (251) to reset power given towards the digital control logic unit (290). The power management unit (250) supplies the power to remaining components of the smart tag.

The antenna (241) receives the wireless signal from the first electronic device (100), generates an electric signal corresponds to the wireless signal, and forwards the electric signal to the matching unit (242). The matching unit (242) matches the receiving signal parameters with the authenticated signal parameters. The matching unit (242) provides its output to the envelope detector (260) and the harmonics injection divider (280). The envelope detector (260) and the harmonics injection divider (280) checks the preamble of a signal unit and share with the data & clock recovery unit (270) to register the acceptance or rejection of a transaction. The data & clock recovery unit (270) extracts the data signals from the output of the envelope detector (260). Further, the data & clock recovery unit (270) provides data signal (271) and a clock signal (272) to the digital control logic unit (290). The harmonics injection divider (280) provides high-frequency clock signal (281) to the digital control logic unit (290). The digital control logic unit (290) reserves and processes of the biometric data obtained from the data signal (271) to decode the biometric of the user and match the biometric with the biometric data that is saved in the memory (220) to make the smart tag secure and unresponsive to non-biometric encrypted signals and responsive only to the data signals that contain the biometric data. Thus, the smart tag may ensure the physical presence of the user to generate the interaction amongst the devices (100, 200) more securely. The digital control logic unit (290) authenticates the first wireless device (100) based on the received wireless signal.

In response to ensure the physical presence of the user and successfully authenticating the first wireless device (100), the digital control logic unit (290) sends acknowledgment data (291) that includes the location details of the smart tag, and/or an approval for accessing and/or controlling the smart tag to the UWB transmitter (243). Alternatively or additionally, the digital control logic unit (290) instructs (282) the harmonics injection divider (280) to enable the UWB transition of the acknowledgment data. In some embodiments, the UWB transmitter (243) sends a wireless signal that includes the acknowledgment data to the first wireless device (100) through the UWB antenna (244). In response to receiving the wireless signal that includes the acknowledgment data from the smart tag, the first wireless device (100) may locate, control, and/or access based on the acknowledgment data.

Although FIG. 3A shows a particular set of hardware components of the second wireless device (200), it is to be understood that other embodiments are not limited thereon. For example, in other embodiments, the second wireless device (200) may include less or more components. Further, the labels and/or names of the components are used only for illustrative purposes and do not limit the scope of the invention. For example, one or more components may be combined together to perform same or substantially similar functionality for authenticating the first wireless device (100).

Figure 3B:
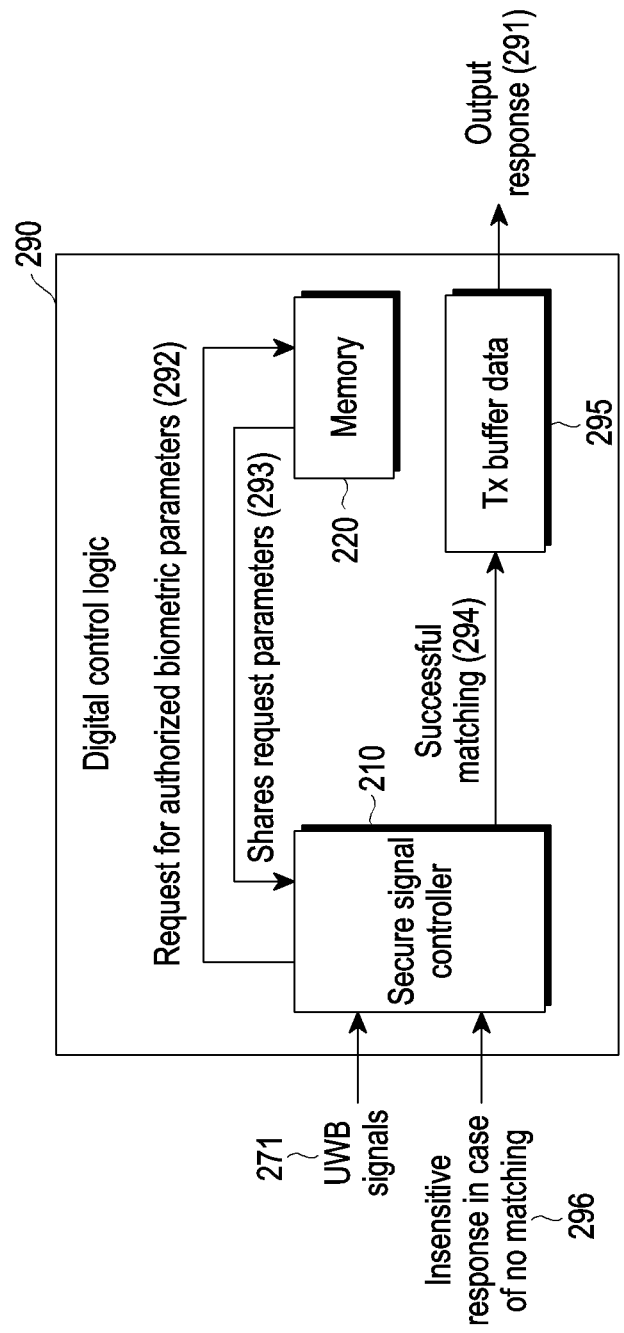
FIG. 3B is a block diagram of a digital control logic of the second wireless device for providing acknowledgment data to the first wireless device based on authenticating the first wireless device, according to an exemplary embodiment as disclosed herein.

FIG. 3B is a block diagram of a digital control logic (290) of the second wireless device (200) for providing acknowledgment data (291) to the first wireless device (100) based on authenticating the first wireless device (100), according to an exemplary embodiment as disclosed herein. In an embodiment, the digital control logic (290) includes the secure signal controller (210), the memory (220), and a transmission data buffer (295). The secure signal controller (210) receives the data signal (271) from the data & clock recovery unit (270). The secure signal controller (210) determines the modified standard parameter from the data signal (271). The secure signal controller (210) pre-stores the standard parameter as the reference parameter of the wireless signal to the memory (220) for registering the user, and/or pairs the first wireless device (100) with the second wireless device (100).

The secure signal controller (210) is configured to authenticate the first wireless device (100) based on the match between the modified standard parameter of the wireless signal and the pre-stored reference parameter of the wireless signal. In an embodiment, the secure signal controller (210) determines the modified standard parameter of the wireless signal. Further, the digital control logic unit (290) fetches (292, 293) the reference parameter of the wireless signal from the memory (220). Further, the digital control logic unit (290) determines whether the modified standard parameter of the wireless signal matches to the reference parameter of the wireless signal pre-registered in the second wireless device (200). The secure signal controller (210) authenticates the first wireless device (100), enables the first wireless device (100) to access, locate, and/or control the second wireless device (200), and send the acknowledgment data to the transmission data buffer (295), in response to determining that the modified standard parameter of the wireless signal successfully matches (294) to the reference parameter of the wireless signal.

The secure signal controller (210) is configured to prevent the first wireless device (100) to access, locate, and/or control the second wireless device (200) and provides an insensitive (e.g., unresponsive) response (296) to the transmission data buffer (295), in response to determining that the modified standard parameter of the wireless signal does not match to the reference parameter of the wireless signal. In response to receiving the acknowledgment data, the transmission data buffer (295) provides the acknowledgment data (291) to the UWB transmitter (243) to transmit the same to the first wireless device (100).

Although FIG. 3B shows a particular set of hardware components of the digital control logic (290), it is to be understood that other embodiments are not limited thereon. For example, in other embodiments, the digital control logic (290) may include less or more components. Further, the labels and/or names of the components are used only for illustrative purposes and do not limit the scope of the invention. For example, one or more components may be combined together to perform same or substantially similar functionality for providing the acknowledgment data (291) to the first wireless device (100) based on authenticating the first wireless device (100).

Figure 4:
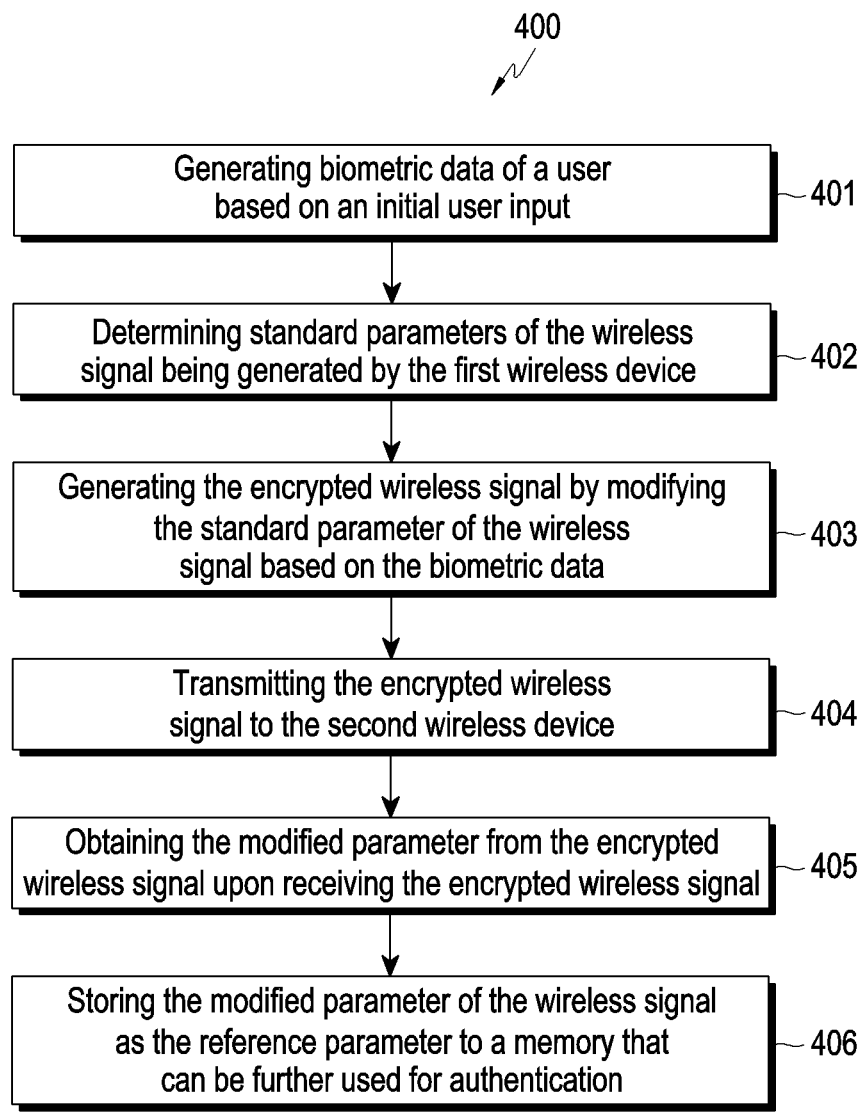
FIG. 4 is a flowchart illustrating a method for pairing the wireless devices and/or registering a user to the wireless devices, according to an embodiment as disclosed herein.

FIG. 4 is a flowchart (400) illustrating a method for pairing the wireless devices and/or registering the user to the wireless devices, according to an embodiment as disclosed herein. The flowchart (400) includes steps 401-406. At step 401, the method includes generating the biometric data of the user based on the initial user input by the first wireless device (100). At step 402, the method includes determining the standard parameter of the wireless signal being generated at the first wireless device (100) by the first wireless device (100). At step 403, the method includes generating the encrypted wireless signal by modifying the standard parameter of the wireless signal based on the biometric data by the first wireless device (100). At step 404, the method includes transmitting the encrypted wireless signal to the second wireless device by the first wireless device (100). At step 405, the method includes obtaining the modified parameter from the encrypted wireless signal upon receiving the encrypted wireless signal by the second wireless device (200). At step 406, the method includes storing the modified parameter of the wireless signal as the reference parameter to the memory (220) that may be further used for authentication by the second wireless device (200).

Figure 5:
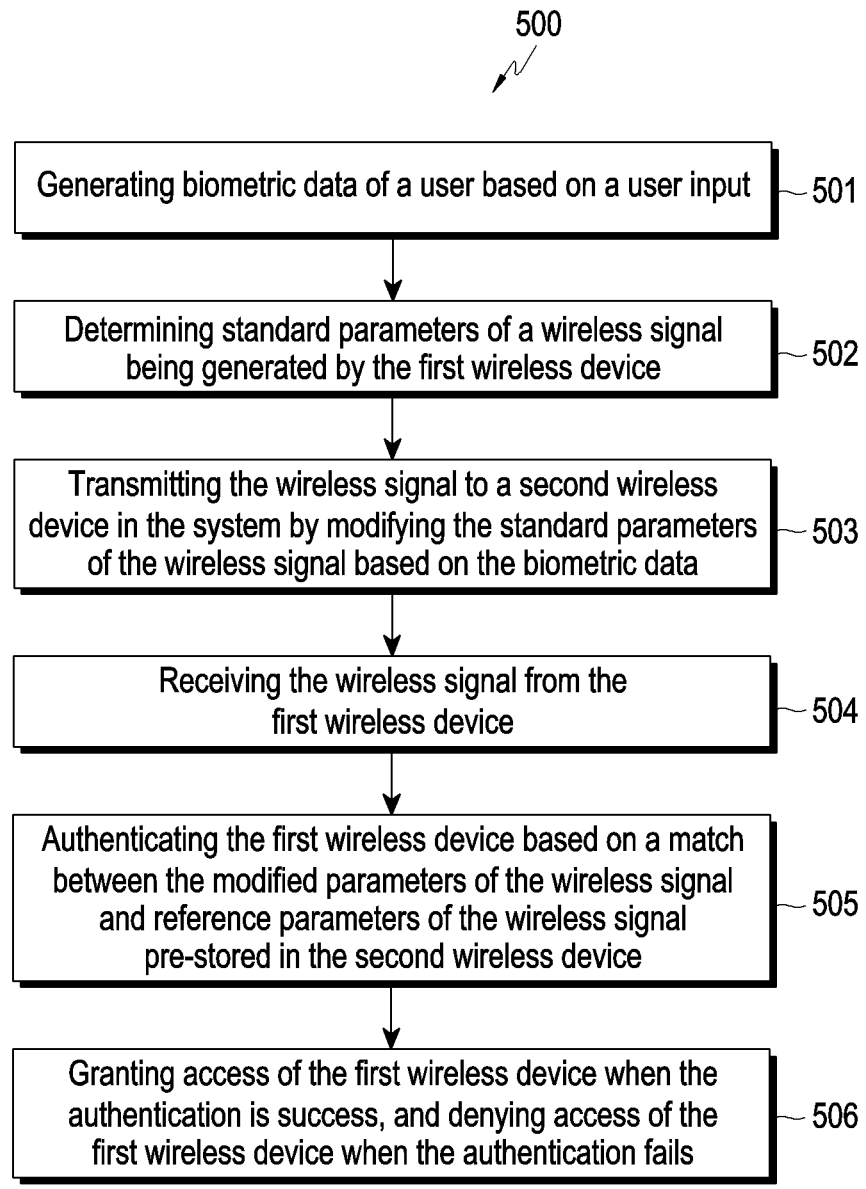
FIG. 5 is a flowchart illustrating a method for authenticating the wireless devices, according to an embodiment as disclosed herein.

FIG. 5 is a flowchart (500) illustrating a method for authenticating the wireless devices, according to an embodiment as disclosed herein. The flowchart (500) includes steps 501-506. At step 501, the method includes generating the biometric data of the user based on the user input by the first wireless device (100). At step 502, the method includes determining the standard parameter of the wireless signal being generated at the first wireless device (100) by the first wireless device (100). At step 503, the method includes transmitting the wireless signal to the second wireless device (200) in the system (1000) by modifying the standard parameter of the wireless signal based on the biometric data by the first wireless device (100). At step 504, the method includes receiving the wireless signal from the first wireless device by the second wireless device (200). At step 505, the method includes authenticating the first wireless device (100) based on the match between the modified parameter of the wireless signal and the reference parameter of the wireless signal pre-stored in the second wireless device by the second wireless device (200). At step 506, the method includes granting, by the second wireless device (200), access of the first wireless device (100) when the authentication is a success, and denying, by the second wireless device (200), access of the first wireless device when the authentication fails.

Figure 6:
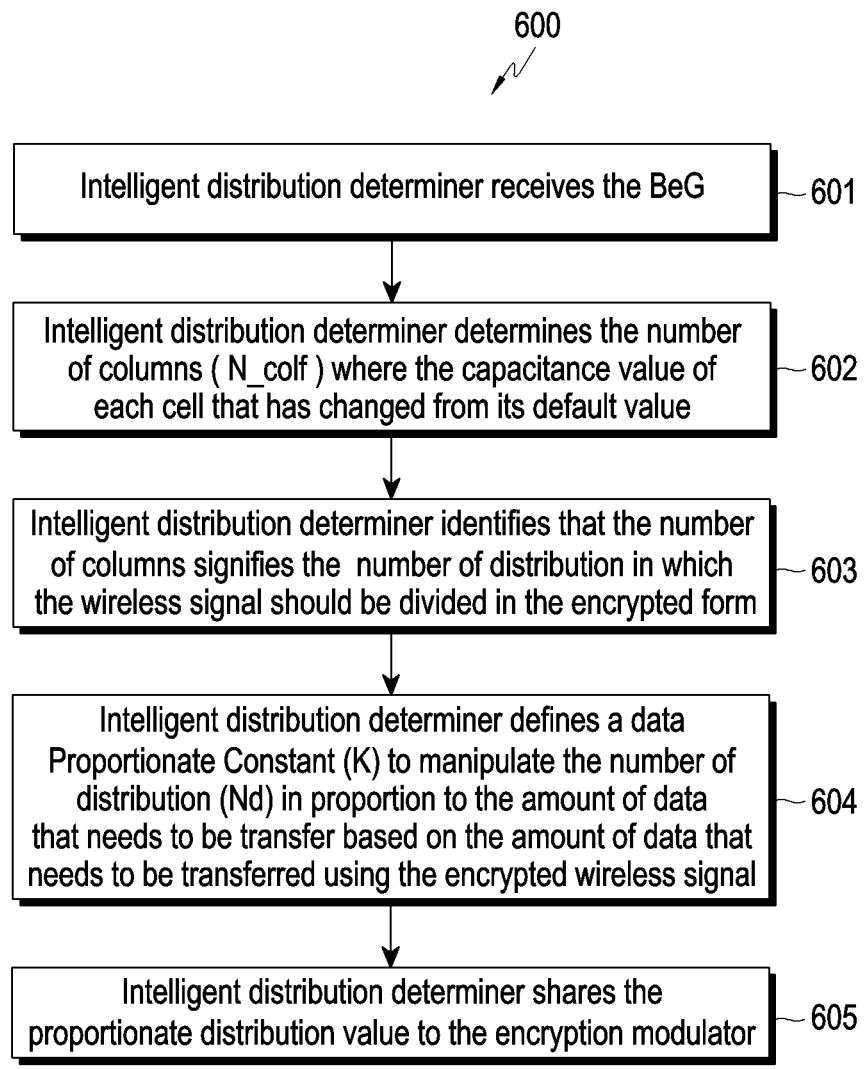
FIG. 6 is a flowchart illustrating a method for determining number of distributions in the wireless signal in proportion to variation in the capacitance value of the cells, according to an embodiment as disclosed herein.

FIG. 6 is a flowchart (600) illustrating a method for determining the number of distributions in the wireless signal in proportion to variations in the capacitance value of the cells, according to an embodiment as disclosed herein. In an embodiment, the intelligent distribution determiner (112) performs steps 601-605 of the flowchart (600). At step 601, the method includes receiving the biometric data (BeG) from the biometric data selector (111), where the biometric data selector (111) obtains the biometric data from the biometric sensor (150). At step 602, the method includes determining the number of columns ($N_{colf}$) where the capacitance value of each cell has changed from its default value. At step 603, the method includes identifying that the number of columns ($N_{colf}$) signifies the number of distribution in which the wireless signal should be divided in the encrypted form. At step 604, the method includes defining the data proportionate constant (K) to manipulate the number of distribution ($N_d$) in proportion to the amount of data that needs to be transferred based on the amount of data that needs to be transferred using the encrypted wireless signal. At step 605, the method includes sharing the proportionate distribution value to the encryption modulator (115).

Figure 7:
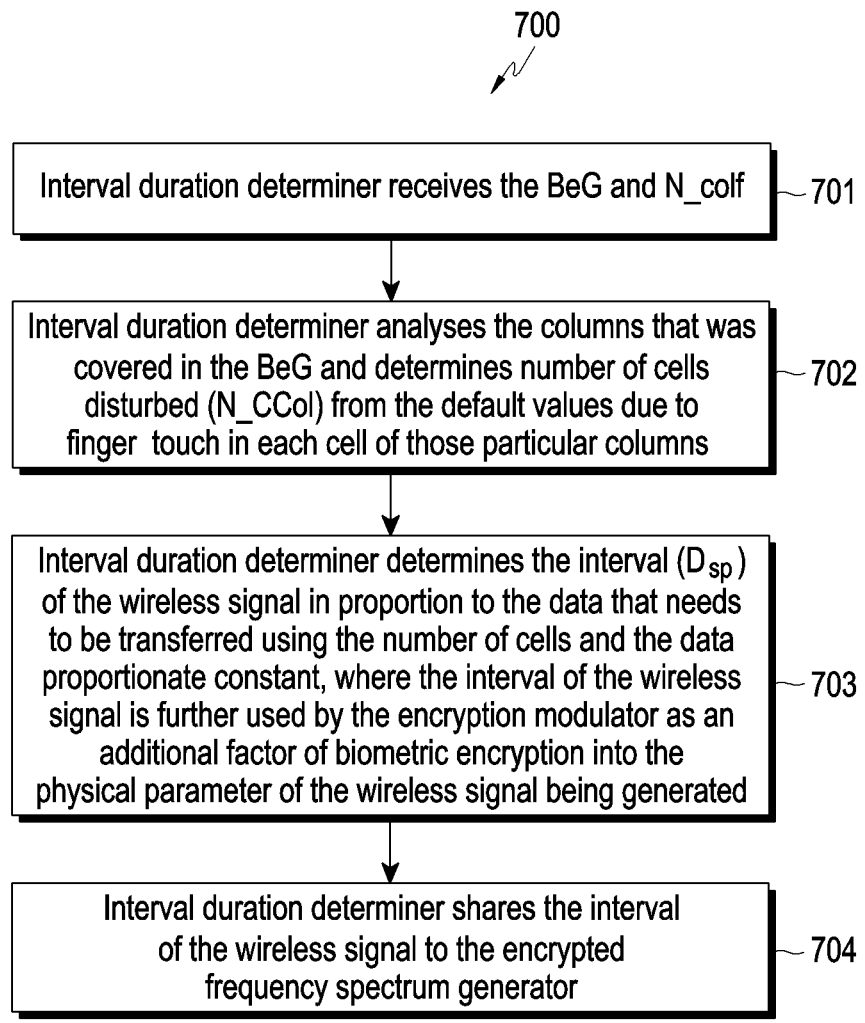
FIG. 7 is a flowchart illustrating a method for determining duration of each distributed short pulse in the wireless signal, according to an embodiment as disclosed herein.

FIG. 7 is a flowchart (700) illustrating a method for determining duration of each distributed short pulse in the wireless signal, according to an embodiment as disclosed herein. In an embodiment, the interval duration determiner (113) performs steps 701-704 of the flowchart (700). At step 701, the method includes receiving the biometric data (BeG) and the number of columns ($N_{colf}$). At step 702, the method includes analyzing the columns that were covered in the biometric data (BeG) and determine the number of cells disturbed ($N_{CCol}$) from the default values due to the biometric (e.g., fingerprint) in each cell of those particular columns. At step 703, the method includes determining the interval ($D_{sp}$) of the wireless signal in proportion to the data that needs to be transferred using the number of cells and the data proportionate constant, where the interval of the wireless signal is further used by the encryption modulator (115) as an additional factor of the biometric encryption into the physical parameter (e.g., standard parameter) of the wireless signal being generated. At step 704, the method includes sharing the interval of the wireless signal to the encrypted frequency spectrum generator (114).

Figure 8:
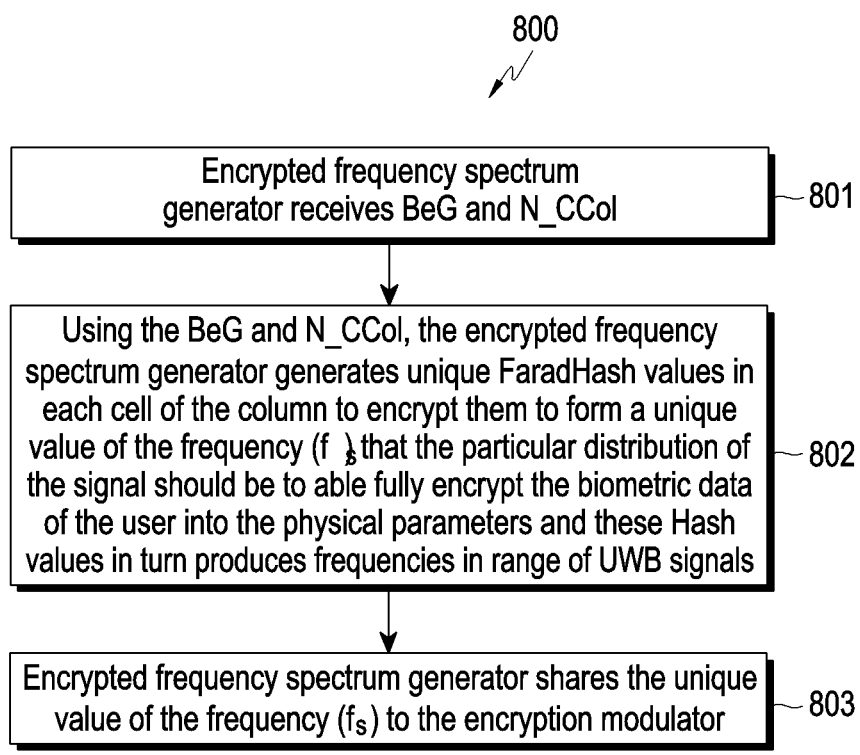
FIG. 8 is a flowchart illustrating a method for determining unique value of a frequency of the wireless signal, according to an embodiment as disclosed herein.

FIG. 8 is a flowchart (800) illustrating a method for determining unique value of the frequency of the wireless signal, according to an embodiment as disclosed herein. In an embodiment, the encrypted frequency spectrum generator (114) performs steps 801-803 of the flowchart (800). At step 801, the method includes receiving the biometric data (BeG) and the number of cells disturbed ($N_{CCol}$). At step 802, the method includes generating the unique FaradHash values in each cell of the column using the biometric data (BeG) and the number of cells disturbed ($N_{CCol}$) to encrypt the unique FaradHash values to form a unique value of the frequency (fs) that the particular distribution of the wireless signal should be able to fully encrypt the biometric data of the user into the physical parameters and these hash values in turn produces frequencies in range of the wireless signal. At step 803, the method includes sharing the unique value of the frequency (fs) to the encryption modulator (115).

Figure 9:
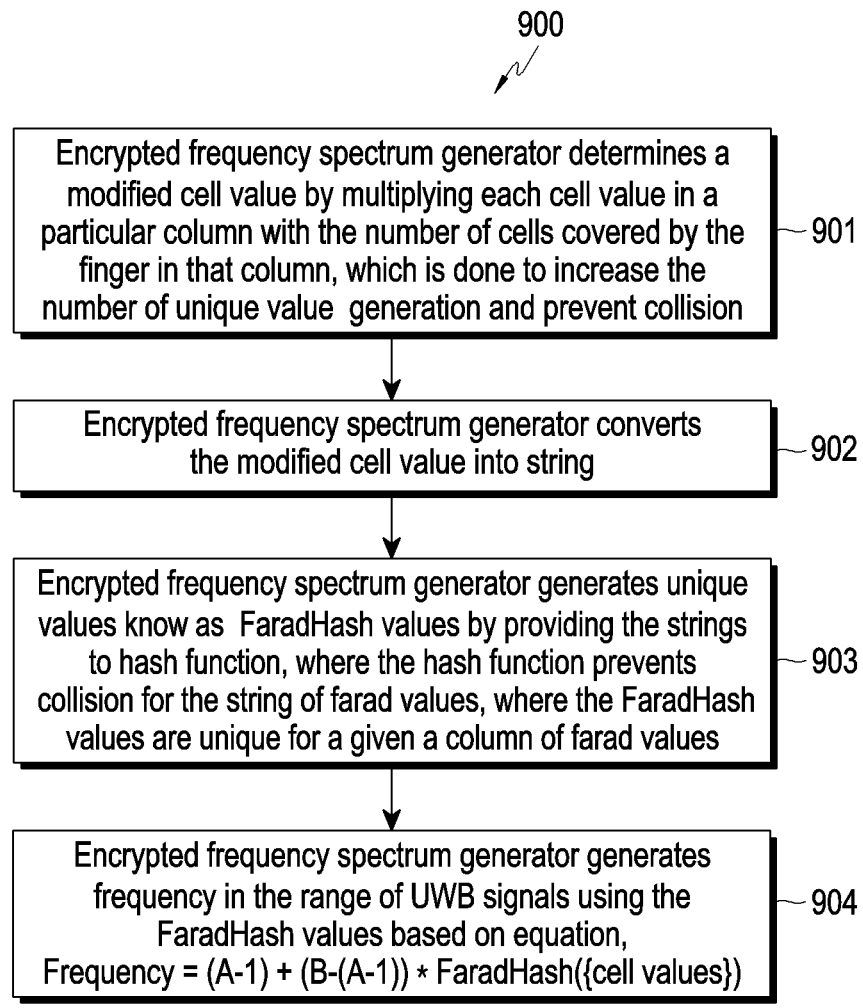
FIG. 9 is a flowchart illustrating a method for generating the unique value of the frequency of the wireless signal, according to an embodiment as disclosed herein.

FIG. 9 is a flowchart (900) illustrating a method for generating the unique value of the frequency of the wireless signal, according to an embodiment as disclosed herein. In an embodiment, the encrypted frequency spectrum generator (114) performs steps 901-904 of the flowchart (900). At step 901, the method includes determining the modified cell value by multiplying each cell value in a particular column with the number of cells covered by the impression of the biometric (e.g., fingerprint) in that column, which allows for an increase in the number of unique value generated and may prevent collisions. At step 902, the method includes converting the modified cell value into a string. At step 903, the method includes generating the unique values known as the FaradHash values by providing the strings to a hash function, where the hash function prevents collision for the string of the farad values, where the FaradHash values are unique for a given column of the farad values. At step 904, the method includes generating the frequency in the range of the wireless signal using the FaradHash values based on Equation 3. An example of steps for performing the hash function includes converting an integer farad value of the biometric into a string value and determining the hash value for a string comprising all farad values.

The various actions, acts, blocks, steps, or the like in the flowcharts (400-900) may be performed in the order presented, in a different order or simultaneously. Further, in some embodiments, some of the actions, acts, blocks, steps, or the like may be omitted, added, modified, skipped, or the like without departing from the scope of the invention.

Figure 10:
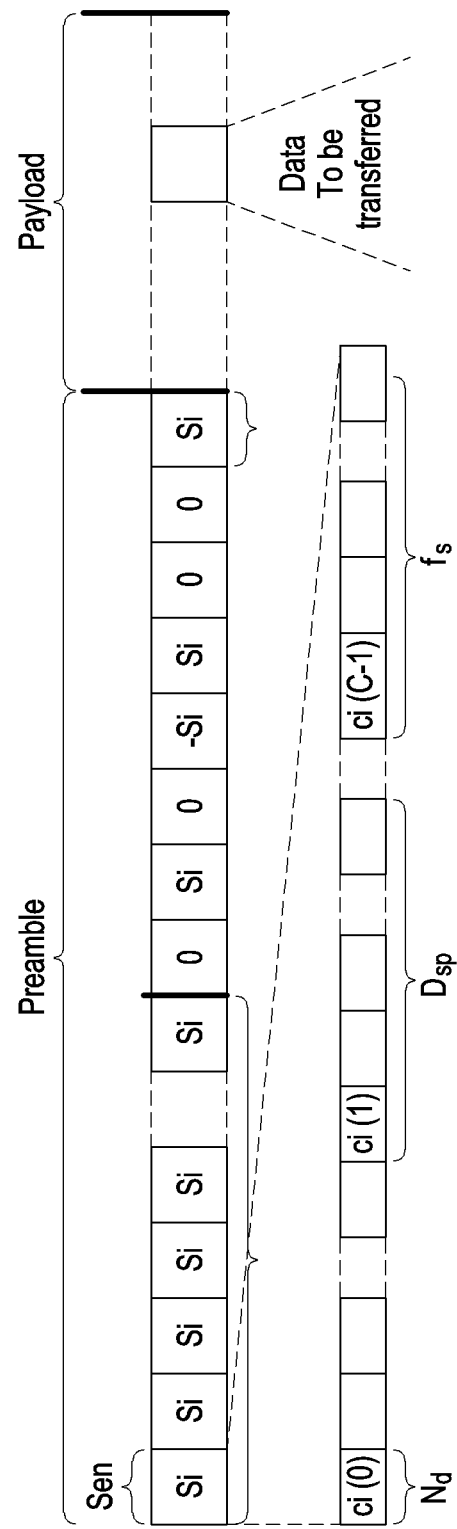
FIG. 10 illustrates a frame format of an ultra-wide band (UWB) signal packet for sharing encrypted biometric data, according to an embodiment as disclosed herein.

FIG. 10 illustrates a frame format of an UWB signal packet for sharing encrypted biometric data, according to an embodiment as disclosed herein. The frame format of the UWB signal packet includes a preamble and a payload. The preamble contains the information about the wireless signal and the payload is the data that is being carried by the wireless signal. The system 1000 embeds the biometric of the user with the physical properties of the wireless signal and thus the biometric does not take away space (e.g., data) from the payload for comprising the security. For example, since the biometric is embedded in the form of various physical parameters of the wireless signal, the various physical parameters may be considered to be part of the preamble. In FIG. 10, "Sen" represents a security encryption in the preamble which carries the biometric information. The preamble consists of a synchronization header, a timestamp, and a payload header.

Figure 11A:
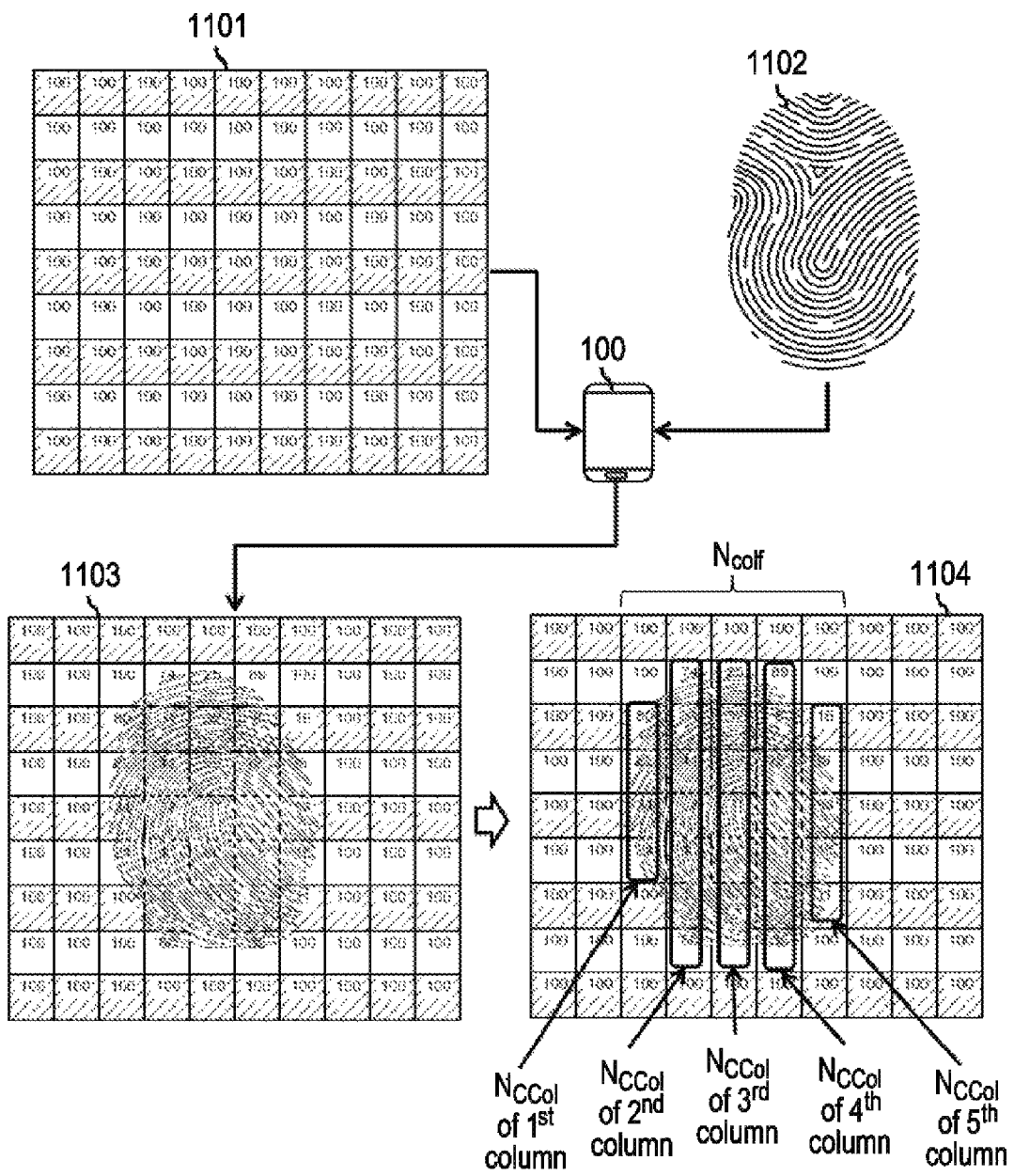
FIGS. 11A, 11B, and 11C illustrate an exemplary embodiment of pairing the first wireless device with the second wireless device, according to an embodiment as disclosed herein.
Figure 11B:
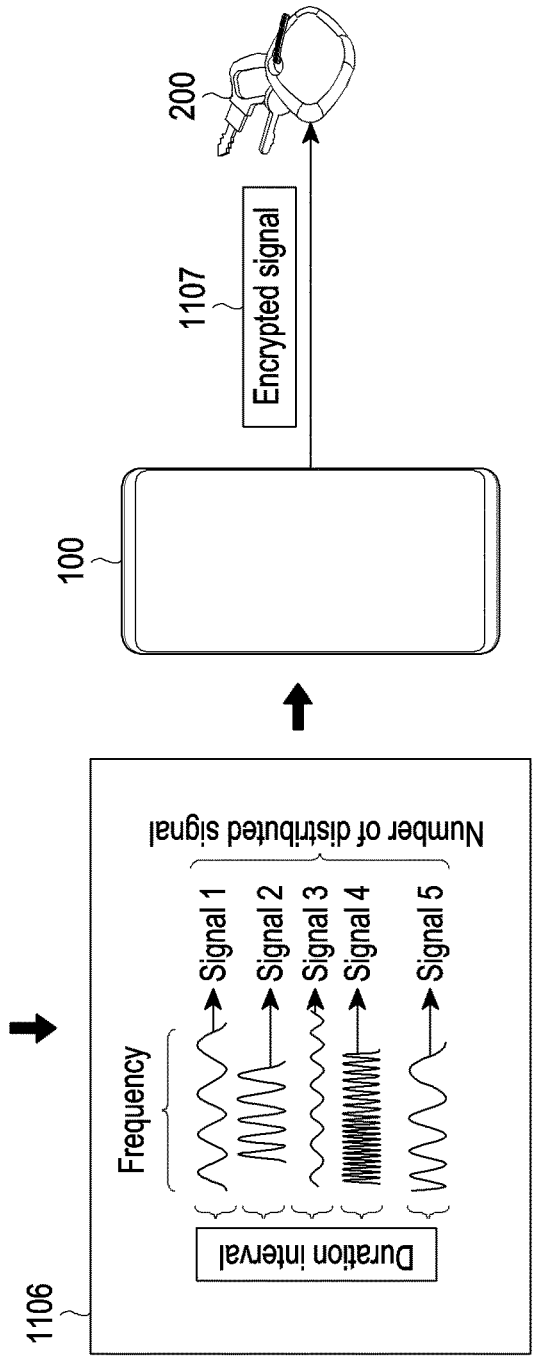
Figure 11C:
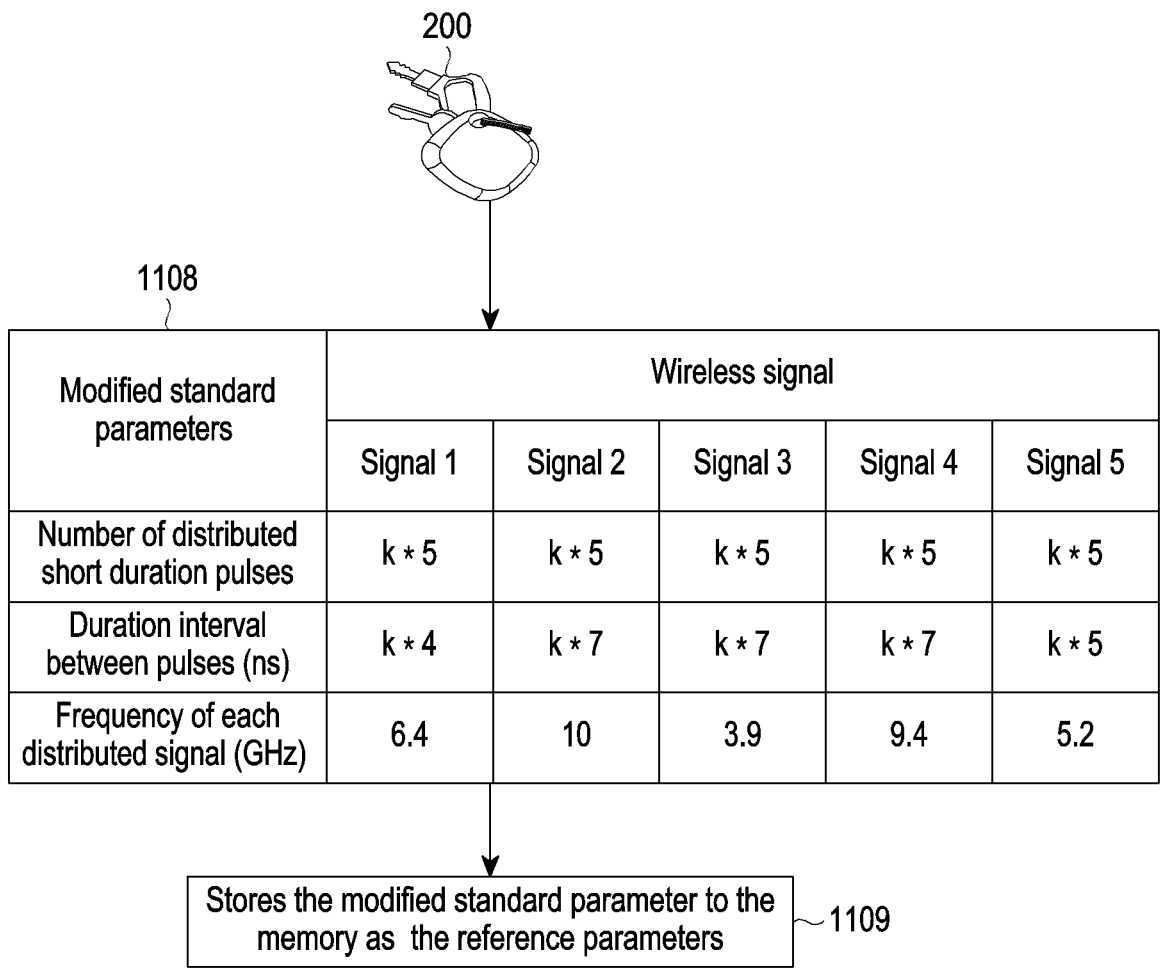

FIGS. 11A, 11B, and 11C illustrate an exemplary embodiment of pairing the first wireless device (100) with second wireless devices (200), according to an embodiment as disclosed herein. In the exemplary embodiment, the first wireless device (100) includes a fingerprint scanner (1101) for scanning a fingerprint (1102) of the user, where the fingerprint scanner (1101) includes a grid of multiple capacitive cells with the default capacitive value of each cell of 100 units. In order to pair the first wireless device (100) with the second wireless devices (200), the user provides inputs to the first wireless device (100) for opening a pairing setup option at the first wireless device (100) and to search for the second wireless devices (200) that are available for pairing. The first wireless device (100) provides a list of second wireless devices (200) available for pairing with first wireless device (100) (not shown). Further, the user may select one or more second wireless devices (200) from the list to be paired with the first wireless device (100). At 1103, the user provides the fingerprint (1102) to the first wireless device (100) by applying the fingerprint (1102) on the fingerprint scanner (1101), where the capacitance value in the capacitance cell changes according to the ridges and valleys of the fingerprint (1102) of the user. Thus, the fingerprint (1102) is encrypted to form the fingerprint data that is a unique combination of the capacitance (farad) value in the cells of the fingerprint scanner (1101).

Referring to FIG. 11B, at 1104, the first wireless device (100) determines the $N_{colf}$, $N_{CCol}$, and the farad values from the fingerprint data. In the example, the $N_{colf}$ is 5, the $N_{CCol}$ of the first column to the fifth column under the $N_{colf}$ are 4, 7, 7, 7, 5 respectively. The first wireless device (100) determines $N_d$ as K*5 nanoseconds (ns) using the $N_{colf}$. The first wireless device (100) determines $D_{sp}$ of the first column to the fifth column under the $N_{colf}$ as K*4 ns, K*7 ns, K*7 ns, K*7 ns, K*4 ns respectively based on the $N_{CCol}$ of the first column to the fifth column under the $N_{colf}$. In the example, the farad values of the first column to the fifth column under the $N_{colf}$ are {80, 22, 34, 23}, {74, 51, 41, 57, 45, 13, 88}, {25, 52, 55, 77, 86, 59, 22}, {80, 08, 18, 17, 78, 78, 35}, {16, 36, 86, 10, 11} respectively. Further, the first wireless device (100) determines the Farad Hash values of the first column to the fifth column under the $N_{colf}$ using the farad values of the first column to the fifth column under the $N_{colf}$. In the example, the Farad Hash values of the first column to the fifth column under the $N_{colf}$ are 0.511, 0.934, 0.221, 0.86, and 0.376 respectively. Further, the first wireless device (100) determines the frequency at which each wireless signal needs to be generated using the Farad Hash values. In the example, the frequency at which each wireless signal needs to be generated are 6.4 GHz, 10.0 GHz, 3.9 GHz, 9.4 GHz, 5.2 GHz. The modified standard parameters of the wireless signals are shown in table 1105 of FIG. 11B.

Referring to FIG. 11B, at 1106, the first wireless device (100) sequentially generates each wireless signal (e.g., signal 1 to signal 5) based on the modified standard parameters. The wireless signal generated based on the modified standard parameter is called the encrypted signal. At 1107, the first wireless device (100) transmits the encrypted signal to the second wireless devices (200).

Referring to FIG. 11C, at 1108, the second wireless devices (200) extracts the modified standard parameter from the encrypted signal upon receiving the encrypted signal from the first wireless device (100). At 1109, the second wireless devices (200) stores the modified standard parameter to the memory (220) as the reference parameters, pairs the first wireless device (100), and registers the user to access the second wireless devices (200).

As described in reference to FIGS. 11A, 11B, and 11C, the first wireless device (100) configures, based on the fingerprint, modified standard parameters of a wireless signal transmitted to the second wireless devices (200). The inclusion of the fingerprint in the generation of the wireless signal, as modified physical parameters, helps in increasing the security of the wireless signal. Alternatively or additionally, since the encryption is on the physical parameters of the wireless signal, the method described herein prevents degradation of data payload carrying capacity of the wireless signal by preventing the security information to be carried as data.

Figure 12A:
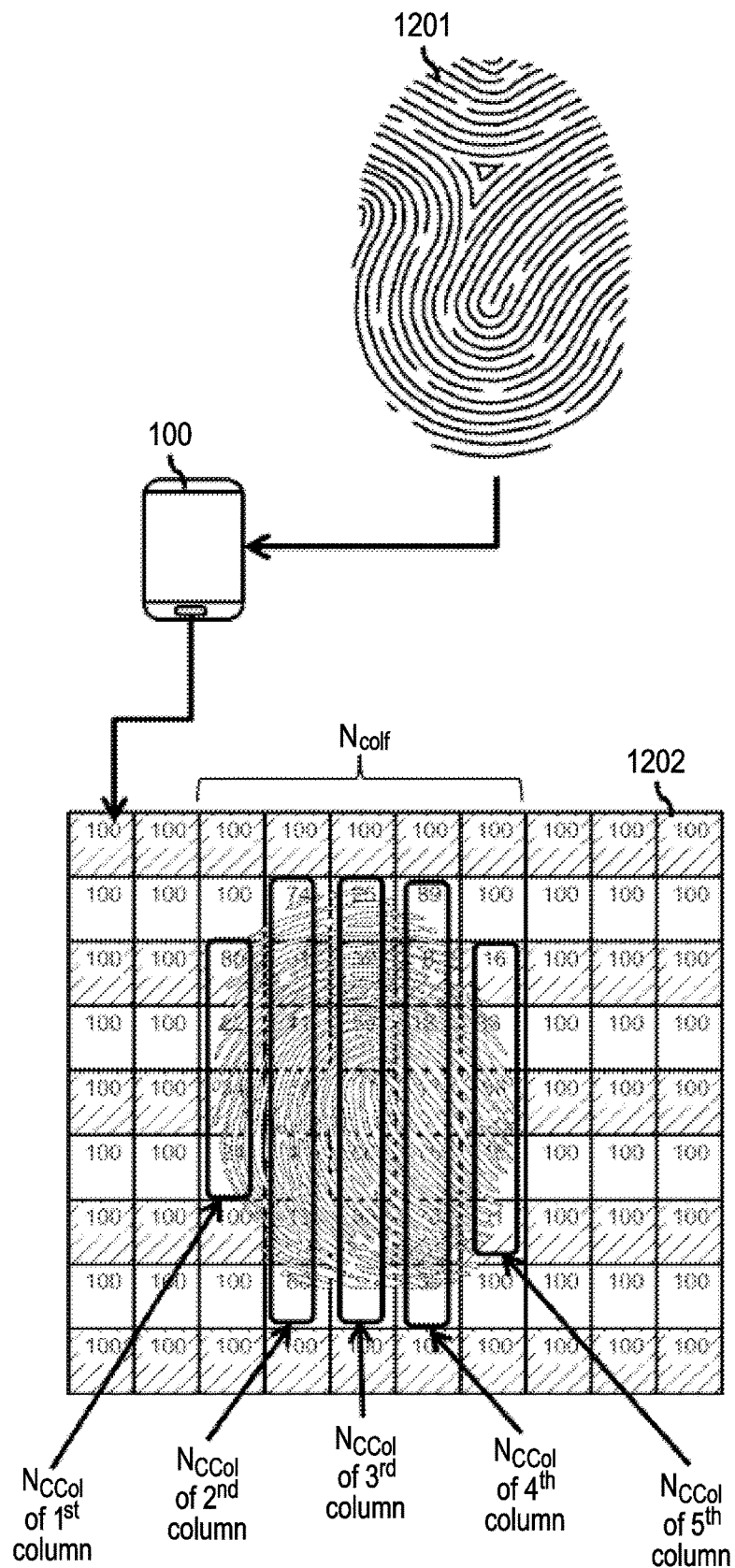
FIGS. 12A, 12B, and 12C illustrate an exemplary embodiment of authenticating the first wireless device by the second wireless device, according to an embodiment as disclosed herein.
Figure 12B:
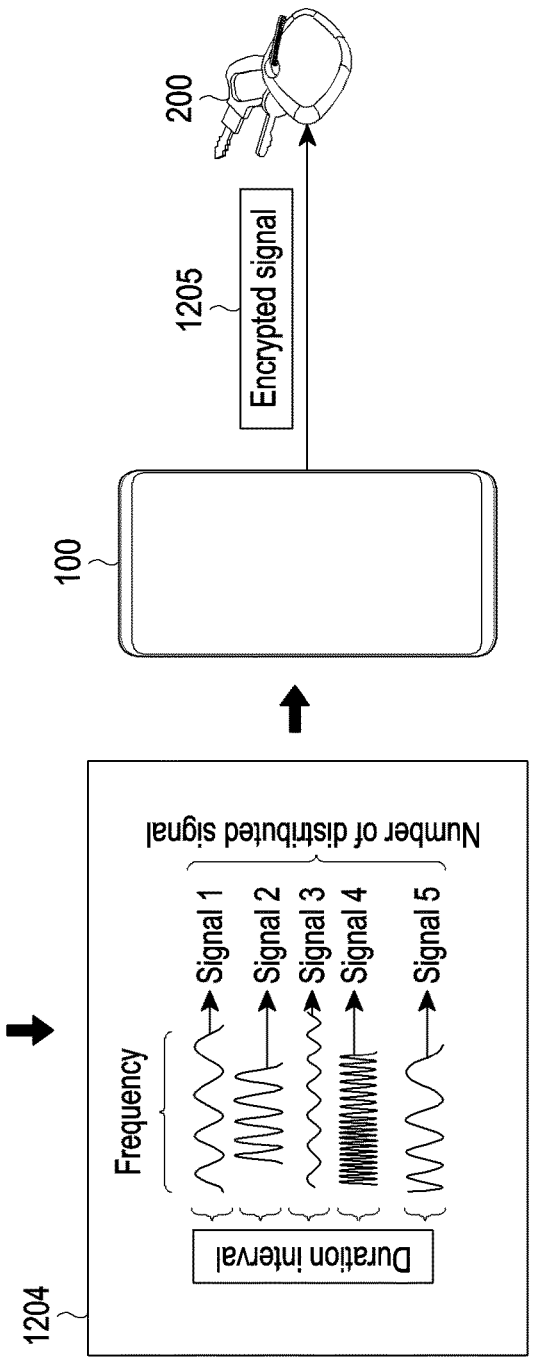
Figure 12C:
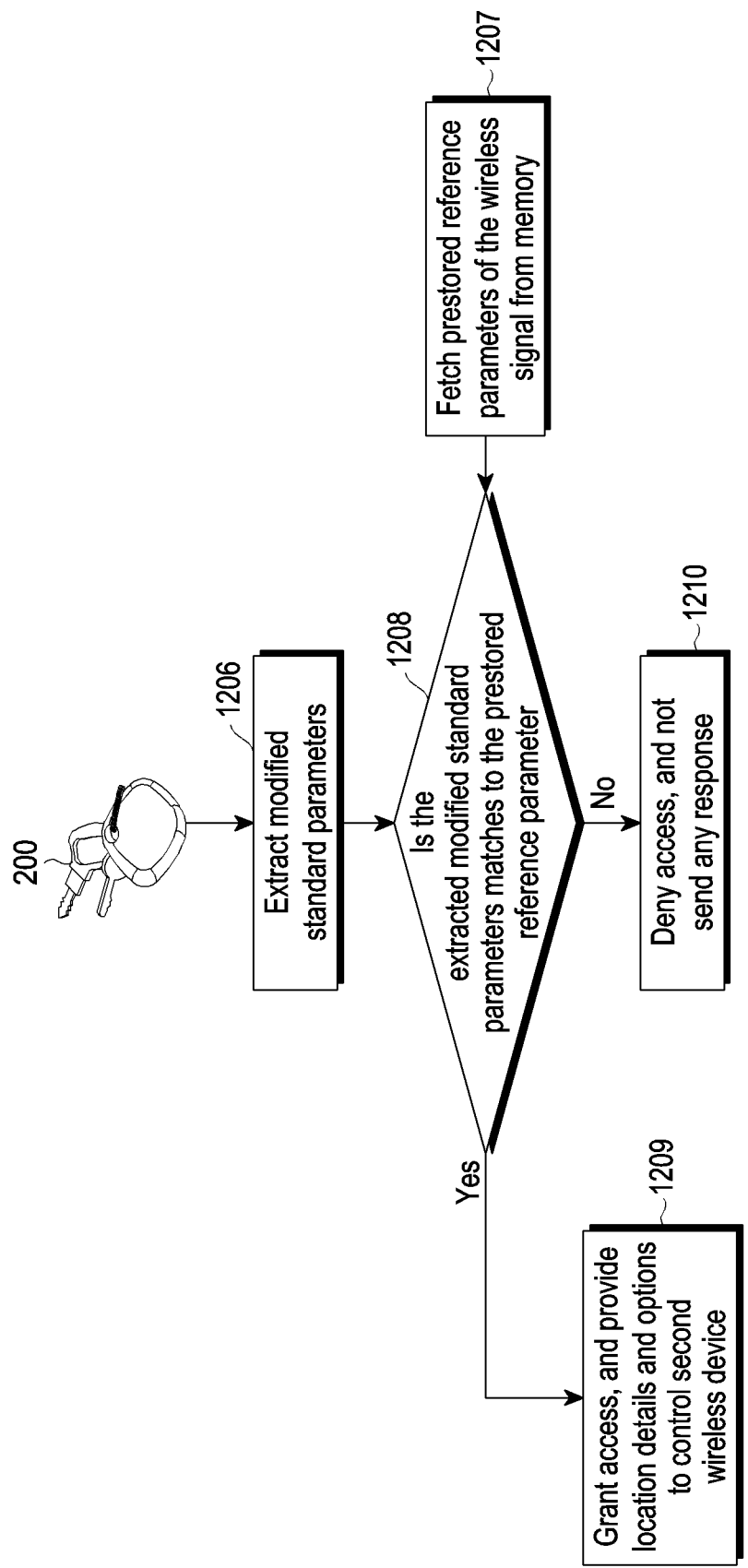

FIGS. 12A, 12B, and 12C illustrate an exemplary embodiment of authenticating the first wireless device (100) by the second wireless device (200), according to an embodiment as disclosed herein. In reference to FIGS. 12A, 12B, and 12C, consider that the first wireless device (100) is already paired with the second wireless device (200). In order to locate the second wireless device (200) using the first wireless device (100), the user provides inputs to the first wireless device (100) for opening a find device option at the first wireless device (100) and search for one or more second wireless devices (200) that are paired with the first wireless device (100), for example. The first wireless device (100) provides the list of one or more second wireless devices (200) that are paired with the first wireless device (100) (not shown). Further, the user may select at least one second wireless device (200) from the list of one or more second wireless devices (200) to indicate that the selected at least one second wireless device (200) is to be searched. At 1201, the user provides the fingerprint to the first wireless device (100) by applying the fingerprint on the fingerprint scanner (150), where the capacitance value in the capacitance cell changes according to the ridges and valley of the fingerprint (1102) of the user. Thus, the fingerprint is encrypted to form a unique combination of the capacitance (farad) values in the cells of the fingerprint scanner (150).

At 1202, the first wireless device (100) determines the $N_{colf}$, $N_{CCol}$, and the farad values from the fingerprint data. In the example, the $N_{colf}$ is 5, the $N_{CCol}$ of the first column to the fifth column under the $N_{colf}$ are 4, 7, 7, 7, 5 respectively. The first wireless device (100) determines $N_d$ as K*5 nanoseconds (ns) using the $N_{colf}$. The first wireless device (100) determines $D_{sp}$ of the first column to the fifth column under the $N_{colf}$ as K*4 ns, K*7 ns, K*7 ns, K*7 ns, K*4 ns respectively based on the $N_{CCol}$ of the first column to the fifth column under the $N_{colf}$. In the example, the farad values of the first column to the fifth column under the $N_{colf}$ are {80, 22, 34, 23}, {74, 51, 41, 57, 45, 13, 88}, {25, 52, 55, 77, 86, 59, 22}, {80, 08, 18, 17, 78, 78, 35}, {16, 36, 86, 10, 11} respectively. Further, the first wireless device (100) determines the Farad Hash values of the first column to the fifth column under the $N_{colf}$ using the farad values of the first column to the fifth column under the $N_{colf}$. In the example, the Farad Hash values of the first column to the fifth column under the $N_{colf}$ are 0.511, 0.934, 0.221, 0.86, and 0.376 respectively. Further, the first wireless device (100) determines the frequency at which each wireless signal needs to be generated using the Farad Hash values. In the example, the frequency at which each wireless signal needs to be generated are 6.4 GHz, 10.0 GHz, 3.9 GHz, 9.4 GHz, 5.2 GHz. The modified standard parameters of the wireless signals are shown in table 1203 of FIG. 12B.

Referring to FIG. 12B, at 1204, the first wireless device (100) sequentially generates each wireless signal (e.g., signal 1 to signal 5) based on the modified standard parameters. The wireless signal generated based on the modified standard parameter is called the encrypted signal. At 1205, the first wireless device (100) transmits the encrypted signal to the one or more second wireless devices (200). At 1206, the one or more second wireless devices (200) extract the modified standard parameter from the encrypted signal upon receiving the encrypted signal from the first wireless device (100). At 1207, the one or more second wireless devices (200) fetch the pre-stored reference parameters of the wireless signal from the memory (220).

At 1208, the one or more second wireless devices (200) check whether the extracted modified standard parameters match to the pre-stored reference parameter. At 1209, the one or more second wireless devices (200) grant access to the first wireless device (100), and provide the location details of the corresponding second wireless device (200) and options to control the corresponding second wireless device (200) to the first wireless device (100), in response to successfully matching the extracted modified standard parameters with the pre-stored reference parameter. At 1210, the one or more second wireless device (200) deny access to the first wireless device (100) and do not send a response to the first wireless device (100), in response to not matching the extracted modified standard parameters with the pre-stored reference parameter.

Figure 13A:
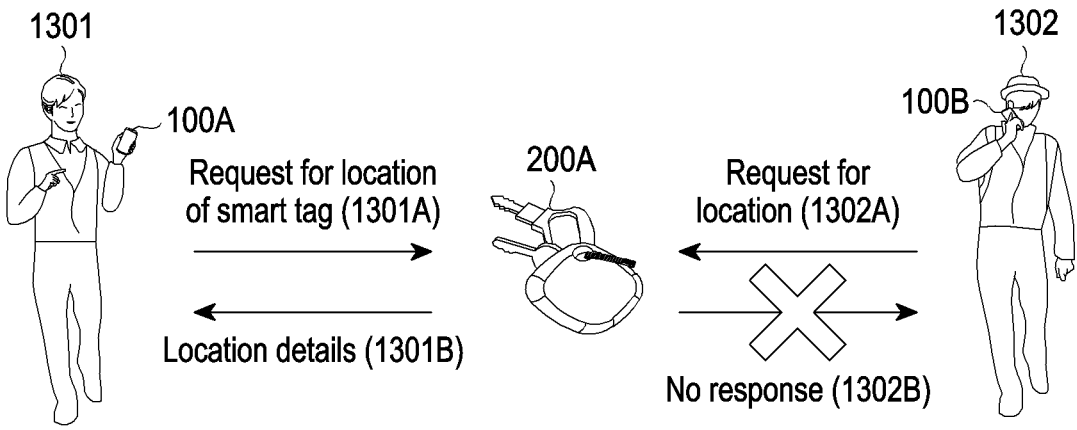
FIG. 13A illustrates an example scenario of preventing the intruder from locating the smart tag, according to an embodiment as disclosed herein.

FIG. 13A illustrates an example scenario of preventing an intruder (1302) from locating a smart tag (200A), according to an embodiment as disclosed herein. In the example scenario, a smartphone (100A) is the first wireless device (100), and the smart tag (200A) is the second wireless device (200). The smartphone (100A) is paired with the smart tag (200A) and the reference parameter of the wireless signal being generated by the smartphone (100A) is stored in the smart tag (200A). A registered user (1301) of the smartphone (100A) and the smart tag (200A) uses the smartphone (100A) to request for the location of the smart tag (200A) by inputting the biometric of the registered user (1301). At step 1301A, the smartphone (100A) sends the request via the wireless signal by modifying the standard parameters of the wireless signal based on the biometric data of the user. The smart tag (200A) receives the wireless signal from the smartphone (100A) and determines the modified standard parameter of the wireless signal from the wireless signal. At step 1301B, in response to successfully matching the modified standard parameter with the pre-stored reference parameter, the smart tag (200A) provides the location details of the smart tag (200A) to the smartphone (100A). Further, the user (1301) may locate the smart tag (200A) based on the location details.

Consider that a smartphone (100B) of the intruder (1302) is not paired with the smart tag (200A). Since the intruder (1302) is not an authorized user to access the smart tag (200A), the smart tag (200A) does not contain a reference parameter of the wireless signal being generated by the smartphone (100B). At step 1302A, the, the smartphone (100B) sends the request via the wireless signal with the standard parameters of the wireless signal due to not receiving the biometric data of the registered user (1301) in real time. The smart tag (200A) receives the wireless signal from the smartphone (100B) and determines the standard parameter of the wireless signal from the wireless signal. Further, the smart tag (200A) matches the standard parameter of the wireless signal with the pre-stored reference parameter of the signal and identifies that the standard parameter of the wireless signal is not matching with the pre-stored reference parameter. At step 1302B, the smart tag (200A) does not respond to the smartphone (100B) due to failure in matching the standard parameter of the wireless signal with the pre-stored reference parameter. Upon not receiving a response from the smart tag (200A), the intruder (1302) may not track the location of the smart tag (200A). Thus, the method presented herein may be used to prevent the intruder (1302) from locating the smart tag (200A) of the registered user (1301).

The smart tag (200A) may identify the authorized (e.g., registered) user based on the biometric encrypted secure wireless signal. As such, the smart tag (200A) only responds to communications from the authentic (e.g., registered) user, regardless of who is holding the smartphone (100A). Therefore, the smart tag (200A) may only be accessed by the authentic user (e.g., registered user), because the smart tag (200A) does not respond to the non-biometric encrypted wireless signals.

Figure 13B:
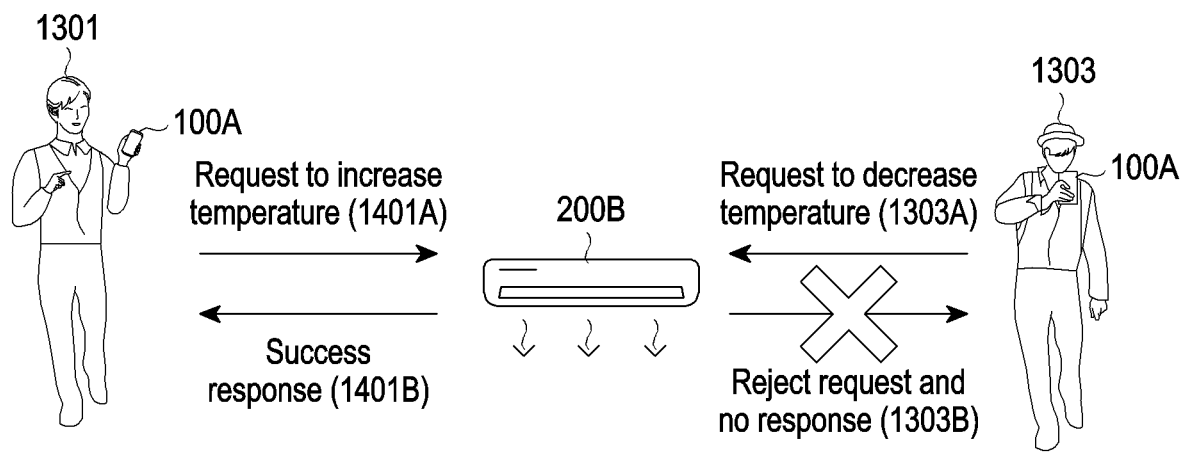
FIG. 13B illustrates an example scenario of preventing the unauthorized user from controlling the smart air conditioner, according to an embodiment as disclosed herein.

FIG. 13B illustrates an example scenario of preventing an unauthorized user from controlling a smart air conditioner (AC) (200B), according to an embodiment as disclosed herein. In the example scenario, the smartphone (100A) is the first wireless device (100), and the smart AC (200B) is the second wireless device (200). The smartphone (100A) is paired with the smart AC (200B) and the reference parameter of the wireless signal being generated by the smartphone (100A) is stored in the smart AC (200B). The registered user (1301) of the smartphone (100A) and of the smart AC (200B) uses the smartphone (100A) to control the smart AC (200B) by inputting the biometric of the registered user (1301) into the smartphone (100A). For example, at step 1401A, the smartphone (100A) sends a request to increase the ambient temperature via a wireless signal by modifying the standard parameters of the wireless signal based on the biometric data of the user (1301). The smart AC (200B) receives the wireless signal from the smartphone (100A) and determines the modified standard parameter of the wireless signal from the wireless signal. At step 1401B, in response to successfully matching the modified standard parameter with the pre-stored reference parameter, the smart AC (200B) increases the ambient temperature and sends a success response to the smartphone (100A).

Consider that a friend (1303) of the registered user (1301) wants to reduce the ambient temperature of the smart AC (200B), where the registered user (1301) is registered with the smartphone (100A) and the smart AC (200B). For example, the registered user (1301) may be away from the smartphone (100A), and the friend (1303) may take the smartphone (100A) and instruct the smartphone (100A) to send a request to the smart AC (200B) for reducing the ambient temperature. At step 1303A, the smartphone (100A) sends the request via the wireless signal with the standard parameters of the wireless signal due to not receiving the biometric data of the registered user (1301) in real time. The smart AC (200B) receives the wireless signal from the smartphone (100A) and determines the standard parameter of the wireless signal from the wireless signal. Further, the smart AC (200B) matches the standard parameter of the wireless signal with the pre-stored reference parameter of the signal and identifies that the standard parameter of the wireless signal is not matching with the pre-stored reference parameter. At step 1303B, the smart tag (200A) rejects the request of the smartphone (100A), does not decrease the ambient temperature, and does not send a response to the smartphone (100A). Thus, the method presented herein may be used to avoid misuse/mishandling of devices of the registered user (1301) in the absence of the registered user (1301).

The biometric scanned smartphone (100A) may communicate with another UWB-equipped device (e.g., smart tag (200A), smart AC (200B)), which also comprises the biometric-based security described herein, without burdening the data payload of such communications with security information. Thus, aspects presented herein may provide more secure communications when compared to conventional devices, while reducing risk of data being shared with unknown and/or unauthorized devices.

Figure 14:
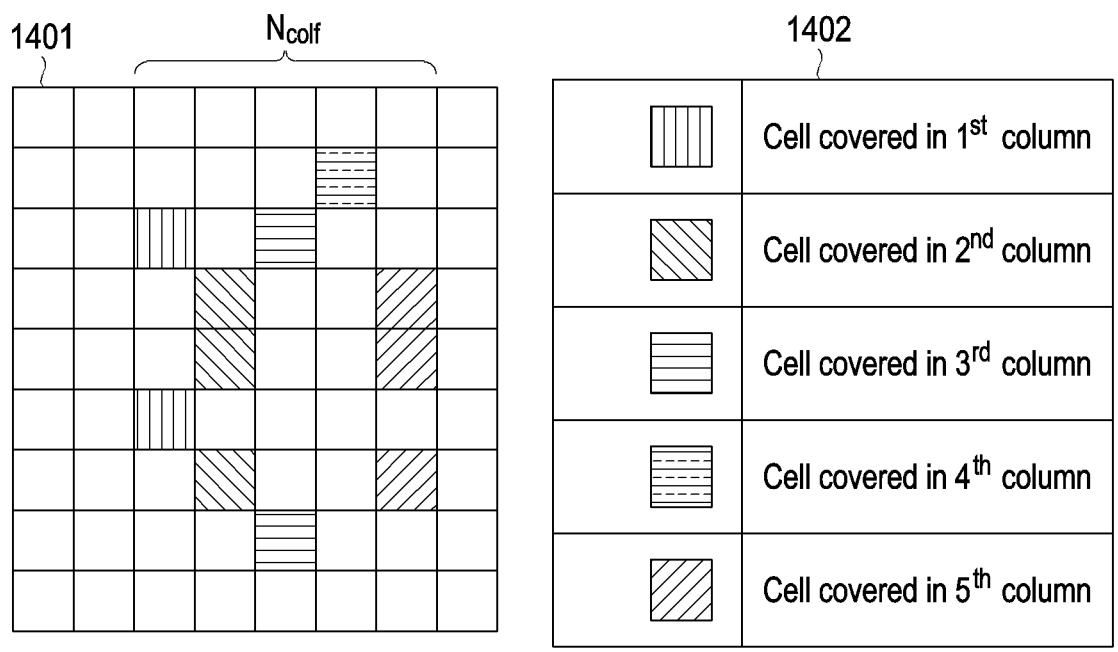
FIG. 14 illustrates a schematic diagram of biometric data of iris of a human eye in a biometric grid, according to an embodiment as disclosed herein.

FIG. 14 illustrates a schematic diagram of biometric data of the iris of a human eye in the biometric grid, according to an embodiment as disclosed herein. Similar to the biometric grid containing fingerprint data of the user described in FIG. 12, a biometric grid (1401) represents the biometric grid containing the iris data of the user. The iris data indicates physical properties of the iris of the human eye of the user. The biometric grid (1401) contains cells with default capacitance value and non-default capacitance value. The cells with non-default capacitance value represents impressions of the iris. The number of columns ($N_{colf}$) in the biometric grid (1401) that contain cells with non-default capacitance value is 5, for example, as shown in FIG. 14. In such an example, the number of cells with non-default capacitance value in the first column in $N_{colf}$ is 2, the number of cells with non-default capacitance value in the second column in $N_{colf}$ is 3, the number of cells with non-default capacitance value in the third column in $N_{colf}$ is 2, the number of cells with non-default capacitance value in the fourth column in $N_{colf}$ is 1, and the number of cells with non-default capacitance value in the fifth column in $N_{colf}$ is 3. Thus, the method presented herein may be used to choose various biometric cell values from the biometric grid according to the number of standard parameters of the wireless signal to vary. Further, the first electronic device (100) may modify the standard parameters of the wireless signal and transmit the wireless signal to the second electronic device (200) for authenticating the first electronic device (100).

Figure 15:
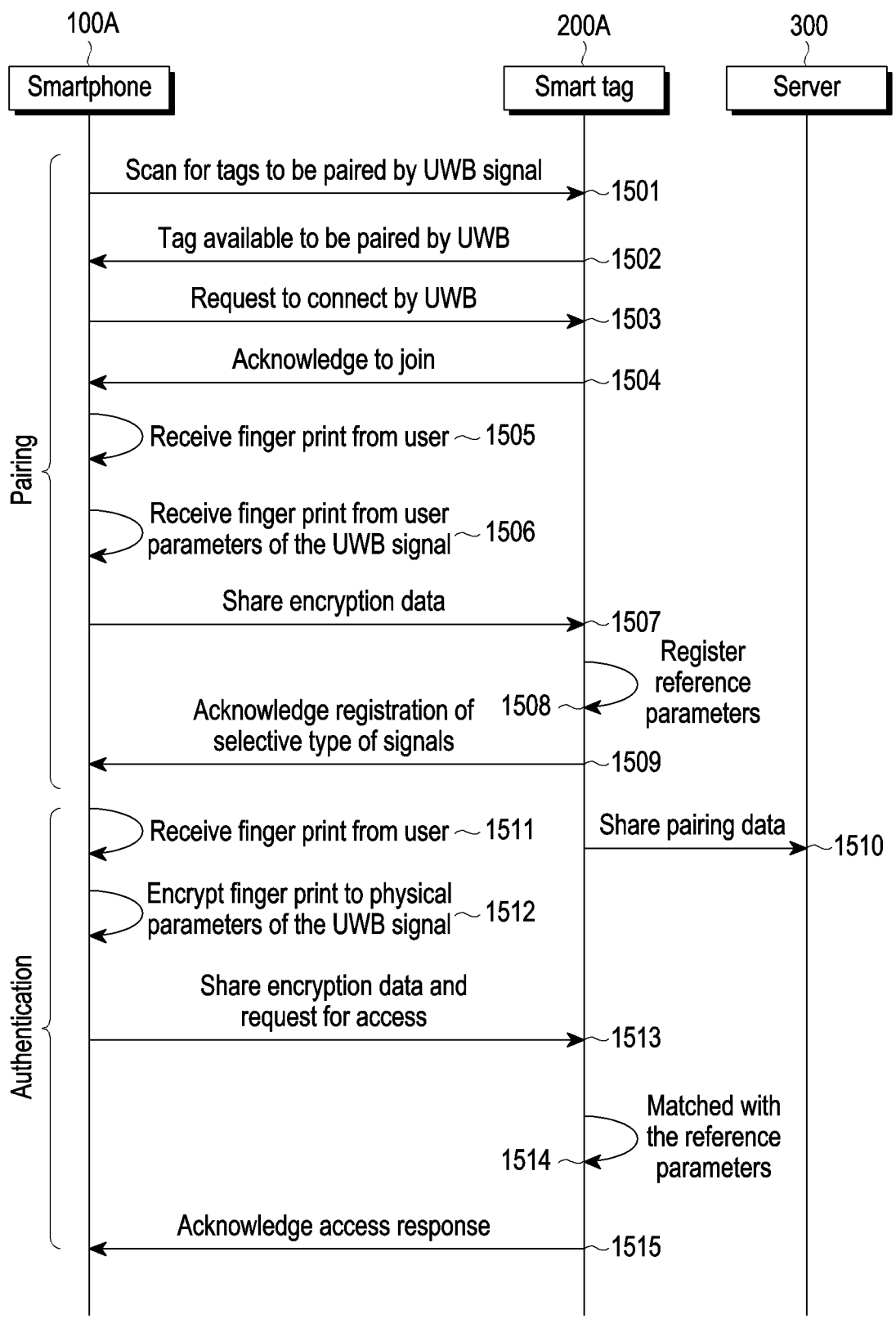
FIG. 15 is a message diagram illustrating signaling between a smartphone, a smart tag, and a server for pairing and authentication, according to an exemplary embodiment as disclosed herein.

FIG. 15 is a message diagram illustrating signaling between the smartphone (100A), the smart tag (200A), and a server (300) for pairing and authentication, according to an exemplary embodiment as disclosed herein. Pairing of the smartphone (100A) with the smart tag (200A) is shown from 1501 to 1510. Authentication of the smartphone (100A) with the smart tag (200A) is shown from 1511 to 1515. At 1501, the smartphone (100A) scans for one or more smart tags (200A) to be paired using a UWB signal. At 1502, the smartphone (100A) receives a corresponding acknowledgement on the availability of the one or more smart tags (200A) from the available one or more smart tags (200A). At 1503, the smartphone (100A) sends a request to connect to the available one or more smart tags (200A) using the UWB signal. At 1504, the smartphone (100A) receives an acknowledgment to connect from the one or more smart tags (200A). At 1505, the smartphone (100A) requests the user of the smartphone (100A) to provide the biometric data (e.g., fingerprint).

Referring to FIG. 15, at 1506, the smartphone (100A) encrypts the fingerprint to the physical parameters of the UWB signal. At 1507, the smartphone (100A) sends the encrypted UWB signal to the one or more smart tags (200A). At 1508, the one or more smart tags (200A) register the reference parameter using the encrypted UWB signal. At 1509, the one or more smart tags (200A) sends an acknowledgement to register the secured/encrypted UWB signal to the smartphone (100A). At 1510, the one or more smart tags (200A) share the pairing data that includes the reference parameters to the server (300). In an embodiment, the server shares the reference parameters to other unpaired second electronic devices (200) (not shown) with which the first electronic device (100) (e.g., smartphone (100A)) likes to access, locate, and/or control based on authentication. The other unpaired second electronic devices (200) may further pair with the first electronic device (100) by obtaining the reference parameters from the server (300) and registering the reference parameter.

Consider, the user wants to locate the one or more smart tags (200A) after the pairing. At 1511, the user provides the fingerprint of the user to the smartphone (100A) for locating the one or more smart tags (200A). At 1512, upon receiving the fingerprint, the smartphone (100A) encrypts the fingerprint to the physical parameters of the UWB signal. At 1513, the smartphone (100A) sends the encrypted UWB signal with the request for access to the one or more smart tags (200A). At 1514, the one or more smart tags (200A) checks the matching of the encrypted physical parameters with the registered reference parameters. At 1515, upon successfully matching the encrypted physical parameters with the registered reference parameters, the one or more smart tags (200A) acknowledge to the smartphone (100A) by sending a access response includes the location details or configurations/grant to control or access the one or more smart tags (200A).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for authenticating wireless devices, comprising:

generating, by a first wireless device, first biometric data of a user based on a first user input;

determining, by the first wireless device, at least one standard parameter of a first wireless signal being generated by the first wireless device;

modifying, by the first wireless device, based on the first biometric data, the at least one standard parameter of the first wireless signal;

generating, by the first wireless device, a second wireless signal based on the at least one modified standard parameter of the first wireless signal; and transmitting, by the first wireless device to a second wireless device, the second wireless signal with the at least one modified standard parameter of the first wireless signal to cause the first wireless device to be authenticated by the second wireless device, based on a match between the at least one modified standard parameter of the first wireless signal and at least one reference parameter of the second wireless signal that has been pre-stored in the second wireless device.

2. The method of claim 1, further comprising:
monitoring an availability of the second wireless device using a third wireless signal;
detecting the availability of the second wireless device;
generating initial biometric data of the user from an initial user input;
determining, at least one standard parameter of the third wireless signal being generated by the first wireless device;
modifying the at least one standard parameter of the third wireless signal based on the initial biometric data;
generating a fourth wireless signal based on the at least one modified standard parameter of the third wireless signal; and
transmitting, by the first wireless device to the second wireless device, the fourth wireless signal with the at least one modified standard parameter of the third wireless signal, causing the second wireless device to pre-store the at least one standard parameter of the fourth wireless signal as the at least one reference parameter of the fourth wireless signal.

3. The method of claim 1, wherein:
the determining of the at least one standard parameter of the first wireless signal comprises:
determining at least one biometric cell value of the first biometric data, wherein the at least one biometric cell value indicates a specific property of the first biometric data and includes a number of columns in a biometric grid that contain a first portion of the first biometric data, a number of cells in each column of the biometric grid that contain a second portion of the first biometric data, and a capacitance value of cells in each column of the biometric grid that contain a third portion of the first biometric data; and
selecting the at least one standard parameter of the first wireless signal based on the specific property of the first biometric data indicated by the at least one biometric cell value; and
the modifying of the at least one standard parameter of the first wireless signal comprises modifying the at least one standard parameter of the first wireless signal based on the at least one biometric cell value.

4. The method of claim 1, further comprising:
receiving, from the second wireless device, an indication that the first wireless device has been enabled to access the second wireless device, based on a determination of a match between the at least one modified standard parameter of the first wireless signal and the at least one reference parameter of the second wireless signal that has been pre-stored in the second wireless device.

5. The method of claim 1, further comprising:
transmitting, to the second wireless device, a third wireless signal, wherein the at least one standard parameter of the third wireless signal has not been modified based on the first biometric data; and
obtaining, based on the transmitting of a fourth wireless signal, an indication that the first wireless device has been denied access to the second wireless device, based on a determination of a mismatch between the at least one standard parameter of the third wireless signal and the at least one reference parameter of the third wireless signal that has been pre-stored in the second wireless device, wherein the determination causes the second wireless device to prevent transmitting, to the first wireless device, a response based on the third wireless signal.

6. The method of claim 1, wherein the at least one standard parameter of the first wireless signal comprises at least one of a number of distribution of short duration pulses of the first wireless signal, a duration of an interval between the short duration pulses of the first wireless signal, a frequency of each distributed short duration pulse, an amplitude of the first wireless signal, a phase of the first wireless signal, or a shape of the first wireless signal.

7. A method for authenticating wireless devices by a second wireless device, comprising:
receiving, from a first wireless device, a first wireless signal with at least one modified standard parameter of a second wireless signal, wherein the second wireless signal is generated by the first wireless device, at least one standard parameter of the second wireless signal has been modified based on first biometric data of a user, and the first wireless signal is generated based on the at least one modified standard parameter of the second wireless signal;
determining whether the at least one modified standard parameter of the second wireless signal matches at least one reference parameter of the first wireless signal pre-stored in the second wireless device; and
authenticating the first wireless device, based on the determining that the at least one modified standard parameter of the second wireless signal matches at least one reference parameter of the first wireless signal pre-stored in the second wireless device.

8. The method of claim 7, further comprising:
receiving, from the first wireless device, an availability request;
transmitting, to the first wireless device, availability of the second wireless device based on the availability request;
receiving, from the first wireless device, a third wireless signal with at least one modified standard parameter of a fourth wireless signal, wherein the fourth wireless signal is generated by the first wireless device, at least one standard parameter of the fourth wireless signal has been modified based on initial biometric data of the user, and the third wireless signal is generated based on the at least one modified standard parameter of the fourth wireless signal;
determining the at least one modified standard parameter of the fourth wireless signal; and
pre-storing the at least one modified standard parameter of the fourth wireless signal as the at least one reference parameter of the third wireless signal to a memory of the second wireless device.

9. The method of claim 7, wherein the receiving of the first wireless signal comprises:
receiving, from the first wireless device, the first wireless signal, wherein the at least one standard parameter of the first wireless signal has been modified based on at least one biometric cell value of the first biometric data, wherein the at least one biometric cell value indicates a specific property of the first biometric data and includes a number of columns in a biometric grid that contain a first portion of the first biometric data, a number of cells in each column of the biometric grid that contain a second portion of the first biometric data, and a capacitance value of cells in each column of the biometric grid that contain a third portion of the first biometric data.

10. The method of claim 7, wherein the authenticating of the first wireless device comprises:
determining the at least one modified standard parameter of the second wireless signal;
fetching the at least one reference parameter of the first wireless signal from a memory of the second wireless device; and
determining whether the at least one modified standard parameter of the second wireless signal matches to the at least one reference parameter of the first wireless signal pre-registered in the second wireless device.

11. The method of claim 10, further comprising:
enabling the first wireless device to access the second wireless device, based on determining that the at least one modified standard parameter of the second wireless signal matches the at least one reference parameter of the first wireless signal.

12. The method of claim 10, further comprising:
denying access to the first wireless device, based on determining that the at least one modified standard parameter of the second wireless signal is different to the at least one reference parameter of the first wireless signal.

13. The method of claim 7, wherein the at least one standard parameter of the second wireless signal comprises at least one of a number of distribution of short duration pulses of the first wireless signal, a duration of an interval between the short duration pulses of the first wireless signal, a frequency of each distributed short duration pulse, an amplitude of the first wireless signal, a phase of the first wireless signal, or a shape of the first wireless signal.

14. A first wireless device, comprising:
at least one processor; and
memory storing instructions that, when executed by the at least one processor individually or collectively, cause the first wireless device to:
generate first biometric data of a user based on a first user input;
determine at least one standard parameter of a first wireless signal being generated by the first wireless device;
modify, based on the first biometric data, the at least one standard parameter of the first wireless signal;
generate a second wireless signal based on the at least one modified standard parameter of the first wireless signal; and
transmit, to a second wireless device, the second wireless signal with the at least one modified standard parameter of the first wireless signal to cause the first wireless device to be authenticated by the second wireless device, based on a match between the at least one modified standard parameter of the first wireless signal and at least one reference parameter of the second wireless signal that has been pre-stored in the second wireless device.

15. The first wireless device of claim 14, wherein the instructions, when executed by at least one processor, further cause the first wireless device to:
monitor an availability of the second wireless device using a third wireless signal;
detect the availability of the second wireless device;
generate initial biometric data of the user from an initial user input;
determine at least one standard parameter of the third wireless signal being generated by the first wireless device;
modify the at least one standard parameter of the third wireless signal based on the initial biometric data;
generate a fourth wireless signal based on the at least one modified standard parameter of the third wireless signal; and
transmit, to the second wireless device, the fourth wireless signal with the at least one modified standard parameter of the third wireless signal, causing the second wireless device to pre-store the at least one standard parameter of the fourth wireless signal as the at least one reference parameter of the fourth wireless signal.

16. The first wireless device of claim 14, wherein the instructions, when executed by at least one processor, further cause the first wireless device to:
determine at least one biometric cell value of the first biometric data, wherein the at least one biometric cell value indicates a specific property of the first biometric data and includes a number of columns in a biometric grid that contain a first portion of the first biometric data, a number of cells in each column of the biometric grid that contain a second portion of the first biometric data, and a capacitance value of cells in each column of the biometric grid that contain a third portion of the first biometric data; and
select the at least one standard parameter of the first wireless signal based on the specific property of the first biometric data indicated by the at least one biometric cell value; and
modify the at least one standard parameter of the first wireless signal based on the at least one biometric cell value.

17. The first wireless device of claim 14, wherein the instructions, when executed by at least one processor, further cause the first wireless device to:
receive, from the second wireless device, an indication that the first wireless device has been enabled to access the second wireless device, based on a determination of a match between the at least one modified standard parameter of the first wireless signal and the at least one reference parameter of the second wireless signal that has been pre-stored in the second wireless device.

18. The first wireless device of claim 14, wherein the instructions, when executed by at least one processor, further cause the first wireless device to:
transmit, to the second wireless device, a third wireless signal, wherein the at least one standard parameter of the third wireless signal has not been modified based on the first biometric data; and
obtain, based on the transmitting of a fourth wireless signal, an indication that the first wireless device has been denied access to the second wireless device, based on a determination of a mismatch between the at least one standard parameter of the third wireless signal and the at least one reference parameter of the third wireless signal that has been pre-stored in the second wireless device, wherein the determination causes the second wireless device to prevent transmitting, to the first wireless device, a response based on the third wireless signal.

19. The first wireless device of claim 14, wherein the at least one standard parameter of the first wireless signal comprises at least one of a number of distribution of short duration pulses of the first wireless signal, a duration of an interval between the short duration pulses of the first wireless signal, a frequency of each distributed short duration pulse, an amplitude of the first wireless signal, a phase of the first wireless signal, or a shape of the first wireless signal.

20. A second wireless device, comprising:
  at least one processor; and
  memory storing instructions that, when executed by the at least one processor individually or collectively, cause a first wireless device to:
    receive, from a first wireless device, a first wireless signal with at least one modified standard parameter of a second wireless signal, wherein the second wireless signal is generated by the first wireless device, at least one standard parameter of the second wireless signal has been modified based on first biometric data of a user, and the first wireless signal is generated based on the at least one modified standard parameter of the second wireless signal;
    determine whether the at least one modified standard parameter of the second wireless signal matches at least one reference parameter of the first wireless signal pre-stored in the second wireless device; and
    authenticate the first wireless device, based on the determining that the at least one modified standard parameter of the second wireless signal matches at least one reference parameter of the first wireless signal pre-stored in the second wireless device.

* * * * *